(12) United States Patent
Yokouchi

(10) Patent No.: US 11,410,004 B2
(45) Date of Patent: Aug. 9, 2022

(54) COLOR PREDICTION METHOD AND COMPUTER READABLE RECORDING MEDIUM HAVING RECORDED THEREIN COLOR PREDICTION PROGRAM

(71) Applicant: SCREEN HOLDINGS CO., LTD., Kyoto (JP)

(72) Inventor: Kenichi Yokouchi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/387,144

(22) Filed: Jul. 28, 2021

(65) Prior Publication Data

US 2022/0092369 A1    Mar. 24, 2022

(30) Foreign Application Priority Data

Sep. 23, 2020   (JP) .............................. JP2020-159130

(51) Int. Cl.
*G06K 15/02* (2006.01)
*G06K 15/10* (2006.01)

(52) U.S. Cl.
CPC ......... *G06K 15/027* (2013.01); *G06K 15/102* (2013.01)

(58) Field of Classification Search
CPC .......................... G06K 15/027; G05K 15/102
See application file for complete search history.

(56) References Cited

U.S. PATENT DOCUMENTS

| 7,835,032 B2 * | 11/2010 | Sekine | .................. H04N 1/603 |
| | | | 358/1.9 |
| 2005/0111017 A1 * | 5/2005 | Takahashi | ............ H04N 1/6027 |
| | | | 358/1.9 |
| 2011/0063633 A1 | 3/2011 | Ernst et al. | |
| 2014/0029027 A1 | 1/2014 | Miyanaga | |

FOREIGN PATENT DOCUMENTS

| EP | 2 284 511 A1 | 2/2011 |
| JP | 2014-027571 A | 2/2014 |

OTHER PUBLICATIONS

K. Deshpande et al., "Recommendations for predicting spot color overprints", (http://www.color.org/ICC_white_paper_43_Draft2kd.doc), retrieved Jun. 7, 2018.

\* cited by examiner

*Primary Examiner* — Quang N Vo
(74) *Attorney, Agent, or Firm* — McDermott Will & Emery LLP

(57) ABSTRACT

First, a color close to a prediction target color is selected as a first similar color from among a plurality of similar candidate colors. Next, a first relational expression representing a relationship of spectral reflectances of a solid patch between a reference medium and a prediction target medium is obtained for the first similar color. Then, spectral reflectances of the solid patch in the prediction target medium for the prediction target color are predicted by applying spectral reflectances of a solid patch in the reference medium for the prediction target color to the first relational expression. Finally, spectral reflectances of each halftone patch in the prediction target medium for the prediction target color are predicted based on the prediction result.

19 Claims, 16 Drawing Sheets

| WAVELENGTH | PREDICTION TARGET COLOR | SIMILAR CANDIDATE COLOR (C1) | SIMILAR CANDIDATE COLOR (C2) | ..... |
|---|---|---|---|---|
| 380 | Re(1) | Rs(1)(1) | Rs(2)(1) | ..... |
| 390 | Re(2) | Rs(1)(2) | Rs(2)(2) | ..... |
| 400 | Re(3) | Rs(1)(3) | Rs(2)(3) | ..... |
| ⋮ | ⋮ | ⋮ | ⋮ | ⋮ |
| 710 | Re(34) | Rs(1)(34) | Rs(2)(34) | ..... |
| 720 | Re(35) | Rs(1)(35) | Rs(2)(35) | ..... |
| 730 | Re(36) | Rs(1)(36) | Rs(2)(36) | ..... |

SPECTRAL REFLECTANCES OF ALL FIRST TYPE PATCHES ARE OBTAINED

SPECTRAL REFLECTANCES OF ONLY SOLID PATCH ARE OBTAINED

COLOR PREDICTION METHOD AND COMPUTER READABLE RECORDING MEDIUM HAVING RECORDED THEREIN COLOR PREDICTION PROGRAM

BACKGROUND OF THE INVENTION

Field of the Invention

The present invention relates to a color prediction method and a color prediction program for predicting a color of a patch in a color chart used for predicting a color obtained by overprinting inks of a plurality of colors (typically, a plurality of colors including a spot color).

Description of Related Art

In recent years, digital printing apparatuses have become popular in the printing industry. However, in the labeling and packaging field, printing (offset printing, gravure printing, flexographic printing, etc.) with printing apparatuses using printing plates (hereinafter referred to as a "conventional printing apparatus" or simply referred to as a "printing apparatus") is still often performed in recent years. Meanwhile, there is an increasing demand for quick delivery for design and content production, and when there are some changes in design or the like in a case in which a conventional printing apparatus is used, cost for recreation of the printing plate or retrogression of the process is high, which is a significant problem. In this respect, a digital printing apparatus does not use a printing plate, and thus, does not need an operation for exchanging or recreating the printing plate. That is, by adopting a digital printing apparatus, it is possible to carry out especially small-lot printing at low cost, and therefore, it is also possible to respond to the demand of quick delivery for design and content production at low cost.

Meanwhile, in the labeling and packaging field, spot colors tend to be often used for enhancing color expression. For this reason, in order to perform printing with a digital printing apparatus using print data generated for printing with a conventional printing apparatus, it is necessary that colors obtained by overprinting spot color inks be predicted and the predicted colors be reproduced with the digital printing apparatus. In the following, prediction values of values (specifically, reflectance or tristimulus values X, Y, and Z in the CIE 1931 XYZ color space) identifying colors obtained by overprinting inks of a plurality of colors is referred to as an "overprint prediction value".

The "Recommendations for predicting spot color overprints" (http://www.color.org/ICC_white_paper_43_Draft2kd.doc) by K. Deshpande and P. Green discloses a method (hereinafter, referred to as "Deshpande et al. method") for relatively easily predicting colors (overprint prediction values) obtained by overprinting inks of a plurality of colors including a spot color. In the Deshpande et al. method, overprint prediction values are expressed as in the following Equations (1) to (3) using tristimulus values X, Y, and Z (see FIG. 20).

$$X = j_x \times (X_b \times X_f) + k_x \quad (1)$$

$$Y = j_y \times (Y_b \times Y_f) + k_y \quad (2)$$

$$Z = j_z \times (Z_b \times Z_f) + k_z \quad (3)$$

Here, $X_b$, $Y_b$, and $Z_b$ are tristimulus values of a background color, $X_f$, $Y_f$, and $Z_f$ are tristimulus values of a foreground color, $j_x$, $j_y$, and $j_z$ are scaling coefficients, and $k_x$, $k_y$, and $k_z$ are constants. Hereinafter, $j_x$, $j_y$, $j_z$, $k_x$, $k_y$, and $k_z$ are collectively referred to as "overprint coefficient".

Meanwhile, color reproduction methods include additive color mixing and subtractive color mixing. In the case of printing, the subtractive color mixing is applied for color reproduction. In this regard, if ideal subtractive color mixing is performed, the stimulus value X of the color obtained by overprinting is represented by "$X_b \times X_f$" (the same applies to the stimulus values Y and Z), for example. However, in order to obtain a more accurate value, it is necessary to make a correction in consideration of an error caused by the use of an opaque ink and reflection of light on the surface. Therefore, in the Deshpande et al. method, a correction using a linear equation is performed as shown in the above Equations (1) to (3).

In the Deshpande et al. method, a color chart as schematically shown in FIG. 21 is used, for example. This color chart is called a "CxF chart". In the example shown in FIG. 21, the CxF chart is composed of twenty-two patches. The eleven patches in the upper part are patches obtained by printing an ink of a target spot color on a base material such as paper at a dot percentage in increments of 10%. The eleven patches in the lower part are patches obtained by printing an ink of a target spot color on black (black solid) at a dot percentage in increments of 10%. As above, the CxF chart includes a plurality of patches corresponding to ink densities of a plurality of levels. The overprint prediction value is calculated using the value (colorimetry value) obtained by the colorimetry of the patches in the CxF chart described above.

Hereinafter, the Deshpande et al. method will be described in detail with reference to the flowchart in FIG. 22, taking, as an example, calculation of an overprint prediction value in the case where a background color is a spot color at a dot percentage of 40% (referred to as a "spot color 1" for convenience) and a foreground color is another spot color at a dot percentage of 60% (referred to as a "spot color 2" for convenience).

First, the CxF chart is printed using the ink of spot color 1, and further, the CxF chart is printed using the ink of spot color 2 (step S900).

Next, the overprint coefficients $j_x$, $j_y$, $j_z$, $k_x$, $k_y$, and $k_2$ of the above Equations (1) to (3) regarding the spot color 2 are calculated using the CxF chart printed using the ink of spot color 2 (referred to as "spot color 2 chart" for convenience) (step S910). In this regard, focusing on the above Equation (1), for example, the practical maximum value and the minimum value for $X_b \times X_f$ are values obtained by the ink of the spot color 2 being applied on the base material and black (black solid), respectively. The same applies to $Y_b \times Y_f$ and $Z_b \times Z_f$. Therefore, in order to calculate the overprint coefficient, in a coordinate system representing the above Equations (1) to (3) (see FIG. 23. Note that FIG. 23 shows only the coordinate system representing the above Equation (1)), the coordinates representing the stimulus value of a state where the ink of the spot color 2 at a dot percentage of 60% is applied on black are defined as a first calibration point P91, and the coordinates representing the stimulus value of a state where the ink of the spot color 2 at a dot percentage of 60% is applied on the base material are defined as a second calibration point P92.

Focusing on, for example, X among the tristimulus values, values are assigned as follows for the first calibration point P91 with respect to the above Equation (1). The value obtained by colorimetry of the patch PA93 in the spot color 2 chart (black stimulus value) is assigned to $X_b$, the value obtained by colorimetry of the patch PA92 in the spot color 2 chart (stimulus value of a state where the ink of the spot color 2 at a dot percentage of 60% is applied on the base material) is assigned to $X_f$, and the value obtained by colorimetry of the patch PA91 in the spot color 2 chart (stimulus value of a state where the ink of the spot color 2 at a dot percentage of 60% is applied on black) is assigned to X (see FIG. 21). In addition, for the second calibration point P92, values are assigned as follows with respect to the above Equation (1). The value obtained by colorimetry of the patch PA94 in the spot color 2 chart (stimulus value of base material) is assigned to $X_b$, the value obtained by colorimetry of the patch PA92 in the spot color 2 chart (stimulus value of a state where the ink of the spot color 2 at a dot percentage of 60% is applied on the base material) is assigned to $X_f$ and X (see FIG. 21).

The overprint coefficients $j_x$ and $k_x$ are calculated by solving a simultaneous equation consisting of the equation relating to the first calibration point P91 and the equation relating to the second calibration point P92. That is, an equation representing a straight line denoted by reference numeral L91 in FIG. 23 is obtained. The overprint coefficients $j_y$, $j_z$, $k_y$, and $k_z$ are similarly calculated.

Although the patches are provided in 10% increments in the CxF chart shown in FIG. 21, an overprint coefficient corresponding to the dot percentage between two patches which are adjacent to each other in the horizontal direction can be obtained on the basis of the colorimetric values obtained by linear interpolation.

Next, the values of $X_b$, $Y_b$, and $Z_b$ (tristimulus values of the background color) for calculating final overprint prediction values in the above Equations (1) to (3) are obtained using the CxF chart printed using the ink of spot color 1 (referred to as "spot color 1 chart" for convenience) (step S920). Specifically, the values of $X_b$, $Y_b$, and $Z_b$ are obtained by colorimetry of the patch PA95 (see FIG. 21) in the spot color 1 chart.

Next, the values of $X_f$, $Y_f$, and $Z_f$ (tristimulus values of the foreground color) for calculating the final overprint prediction values in the above Equations (1) to (3) are obtained using the spot color 2 chart (step S930). Specifically, the values of $X_f$, $Y_f$, and $Z_f$ are obtained by colorimetry of the patch PA92 (see FIG. 21) in the spot color 2 chart.

Finally, the values obtained in steps S910 to S930 are substituted into the above Equations (1) to (3), whereby the tristimulus values X, Y, and Z as overprint prediction values are calculated (step 3940). This corresponds to, for example, calculating, as the value of X, the ordinate value of the straight line L91 in FIG. 23 when the abscissa indicates the product of "$X_b$ calculated in step S920" and "$X_f$ calculated in step S930".

In the above processing, the values of X, $X_f$, and $X_b$ relating to the first calibration point P91 (see FIG. 23) are obtained by colorimetry of the patches PA91, PA92, and PA93 in the spot color 2 chart. However, if a highly accurate overprint prediction value is not necessary, the first calibration point P91 can be regarded as being located at the origin of the graph in FIG. 23 for simplicity. In this case, the colorimetry of the patches PA91 and PA93 in the spot color 2 chart is not necessary (the colorimetry of the patch PA92 is still necessary for obtaining the values of X and $X_f$ of the second calibration point P92). In this case, the tristimulus values X, Y, and Z as the overprint prediction values can be calculated without printing the lower patch group including the patches PA91 and PA93 in the CxF chart shown in FIG. 21. The CxF chart having the upper patch group shown in FIG. 21 without having the lower patch group is herein referred to as a "simple CxF chart" for convenience.

As described above, according to the Deshpande et al. method, color prediction is performed using a CxF chart, for example, as shown in FIG. 21. However, even when printing using spot colors is performed, such a CxF chart is usually not printed in advance. For this reason, it is necessary to print the same number of CxF charts as the same number of the spot colors and perform colorimetry of the respective patches. This causes an increase in cost and man-hours.

Furthermore, even if the printing and colorimetry of the CxF chart have already been performed for a certain spot color, when the print medium (base material) (for example, printing paper) is changed, the printing and colorimetry of the CxF chart need to be performed again using the changed print medium. This causes an increase in cost and man hours.

Therefore, Japanese Laid-Open Patent Publication No. 2014-27571 discloses an invention of a color adjustment device that predicts a color value in a specific sheet from a color value in an unspecified sheet based on a relational expression associating the color value in the specific sheet (recommended sheet) with the color value in the unspecified sheet.

According to the invention disclosed in Japanese Laid-Open Patent Publication No. 2014-27571, regression learning is performed to obtain the relational expression. In this regard, if the number of pieces of teaching data used for the regression learning is insufficient, the color value cannot be accurately predicted. In other words, a large number of pieces of teaching data is required to obtain a highly accurate relational expression. Therefore, the work cost for preparing the teaching data and the like increases. Further, the invention disclosed in Japanese Laid-Open Patent Publication No. 2014-27571 originally intends to predict a color value on a specific sheet in one printing apparatus based on a relational expression of color values between sheets (between the specific sheet and an unspecified sheet) in another printing apparatus, and does not intend to predict a color when a print medium is changed where a specific printing apparatus is used.

SUMMARY OF THE INVENTION

Therefore, an object of the present invention is to make it possible to predict, based on a colorimetric result of a CxF chart in a certain print medium, a color of each patch of the CxF chart when another print medium is used, at low cost and with high accuracy.

One aspect of the present invention is directed to a color prediction method for predicting a color of each patch when a color chart including a plurality of patches corresponding to ink densities of a plurality of levels is assumed to be created by applying an ink of a prediction target color to a prediction target medium with ink densities of the plurality of levels, the plurality of patches including a solid patch on which an ink is applied at a maximum ink density, a medium color patch on which an ink is not applied, and a plurality of halftone patches on which inks are applied at ink densities between the solid patch and the medium color patch, the color prediction method including:

a first similar color selection step of selecting a color close to the prediction target color from among a plurality of similar candidate colors as a first similar color, the plurality of similar candidate colors being a plurality of colors for which spectral characteristics of the solid patch in a reference medium and spectral characteristics of the solid patch in the prediction target medium are obtained, the reference medium being a medium in which spectral characteristics of the solid patch for the prediction target color are obtained;

a first relational expression calculation step of obtaining a first relational expression for the first similar color, the first relational expression representing a relationship between the spectral characteristics of the solid patch in the reference medium and the spectral characteristics of the solid patch in the prediction target medium;

a solid prediction step of obtaining predicted values of spectral characteristics of the solid patch in the prediction target medium for the prediction target color by applying the spectral characteristics of the solid patch in the reference medium for the prediction target color to the first relational expression; and a halftone prediction step of, based on the predicted values obtained in the solid prediction step, obtaining predicted values of spectral characteristics of the plurality of halftone patches in the prediction target medium for the prediction target color.

According to such a configuration, predicted values of spectral characteristics of a solid patch in a prediction target medium for a prediction target color is obtained by applying spectral characteristics of a solid patch in a reference medium for the prediction target color to the first relational expression representing the relationship between the reference medium and the prediction target medium for a color (first similar color) close to the prediction target color (relationship between spectral characteristics of the solid patch in the reference medium and spectral characteristics of the solid patch in the prediction target medium). Furthermore, based on the predicted values, predicted values of spectral characteristics of each halftone patch in the prediction target medium for the prediction target color is obtained. As the spectral characteristics for the prediction target color are predicted using the relationship between the reference medium and the prediction target medium for the color close to the prediction target color in this manner, the spectral characteristics can be accurately predicted without requiring a large number of pieces of data (for example, teaching data in machine learning). As described above, it is possible to predict, based on a colorimetric result of a color chart (typically, a CxF chart) in a certain medium (print medium), a color of each patch of the color chart when another medium (print medium) is used, at low cost and with high accuracy.

Another aspect of the present invention is directed to a color prediction method for predicting a color of each patch when a color chart including a plurality of patches corresponding to ink densities of a plurality of levels is assumed to be created by applying an ink of a prediction target color to a prediction target medium with ink densities of the plurality of levels, the plurality of patches including a solid patch on which an ink is applied at a maximum ink density, a medium color patch on which an ink is not applied, and a plurality of halftone patches on which inks are applied at ink densities between the solid patch and the medium color patch, the color prediction method including:

a first relational expression calculation step of obtaining a first relational expression for each of a plurality of similar candidate colors, the first relational expression representing a relationship between spectral characteristics of the solid patch in the reference medium and spectral characteristics of the solid patch in the prediction target medium, the plurality of similar candidate colors being a plurality of colors for which the spectral characteristics of the solid patch in a reference medium and the spectral characteristics of the solid patch in the prediction target medium are obtained, the reference media being a medium in which spectral characteristics of the solid patch for the prediction target color are obtained;

a first similar color selection step of selecting a color close to the prediction target color from the plurality of similar candidate colors as a first similar color;

a solid prediction step of obtaining predicted values of spectral characteristics of the solid patch in the prediction target medium for the prediction target color by applying the spectral characteristics of the solid patch in the reference medium for the prediction target color to the first relational expression for the first similar color; and a halftone prediction step of, based on the predicted values obtained in the solid prediction step, obtaining predicted values of spectral characteristics of the plurality of halftone patches in the prediction target medium for the prediction target color.

According to such a configuration, a processing load when color prediction is actually performed may be reduced, by obtaining the first relational expression representing the relationship between the spectral characteristics of the solid patch in the reference medium and the spectral characteristics of the solid patch in the prediction target medium for all of similar candidate colors in advance.

Still another aspect of the present invention is directed to a non-transitory computer readable recording medium recording a color prediction program that predicts a color of each patch when a color chart including a plurality of patches corresponding to ink densities of a plurality of levels is assumed to be created by applying an ink of a prediction target color to a prediction target medium with ink densities of the plurality of levels, the plurality of patches including a solid patch on which an ink is applied at a maximum ink density, a medium color patch on which an ink is not applied, and a plurality of halftone patches on which inks are applied at ink densities between the solid patch and the medium color patch, the color prediction program causes a computer to execute:

a first similar color selection step of selecting a color close to the prediction target color from among a plurality of similar candidate colors as a first similar color, the plurality of similar candidate colors being a plurality of colors for which spectral characteristics of the solid patch in a reference medium and spectral characteristics of the solid patch in the prediction target medium are obtained, the reference medium being a medium in which spectral characteristics of the solid patch for the prediction target color are obtained;

a first relational expression calculation step of obtaining a first relational expression for the first similar color, the first relational expression representing a relationship between the spectral characteristics of the solid patch in the reference medium and the spectral characteristics of the solid patch in the prediction target medium;

a solid prediction step of obtaining predicted values of spectral characteristics of the solid patch in the prediction target medium for the prediction target color by applying the spectral characteristics of the solid patch in the reference medium for the prediction target color to the first relational expression; and a halftone prediction step of, based on the predicted values obtained in the solid prediction step, obtaining predicted values of spectral characteristics of the plurality of halftone patches in the prediction target medium for the prediction target color.

These and other objects, features, modes, and advantageous effects of the present invention will become more apparent from the following detailed description of the present invention with reference to the accompanying drawings.

DETAILED DESCRIPTION OF PREFERRED EMBODIMENT

0. Introduction

Figure 1:
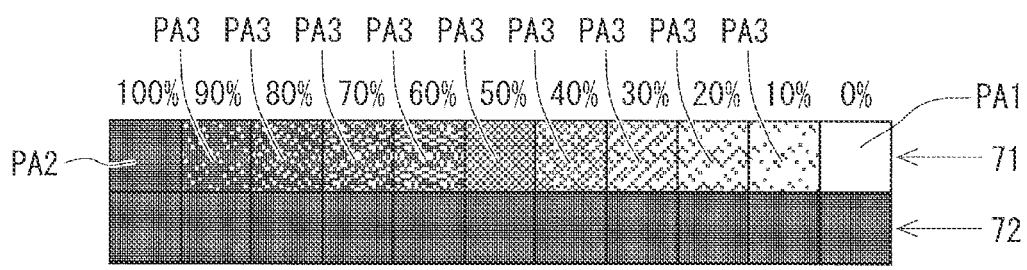
FIG. 1 is a diagram for describing terms regarding a CxF chart used herein.

First, terms used in the following description will be described with reference to a CxF chart illustrated in FIG. 1. Upper patches in the CxF chart (patches of the part denoted by reference numeral 71 in FIG. 1) (patches obtained by applying a target ink on a print medium) are referred to as "first type patches", and lower patches in the CxF chart (patches of the part denoted by reference numeral 72 in FIG. 1) (patches obtained by applying a target ink on black) is referred to as "second type patches". Furthermore, a patch representing the color of the print medium itself (patch denoted by reference numeral PA1 in FIG. 1) is referred to as a "medium color patch", a patch in a state where the target ink is applied solidly (with maximum ink density) on the print medium (patch denoted by reference numeral PA2 in FIG. 1) is referred to as a "solid patch", and patches other than the medium color patch PA1 and the solid patch PA2 (patches denoted by reference numeral PA3 in FIG. 1) among the first type patches 71 are referred to as "halftone patches". The simple CxF chart described above is a CxF chart including only the first type patches 71.

Figure 2:
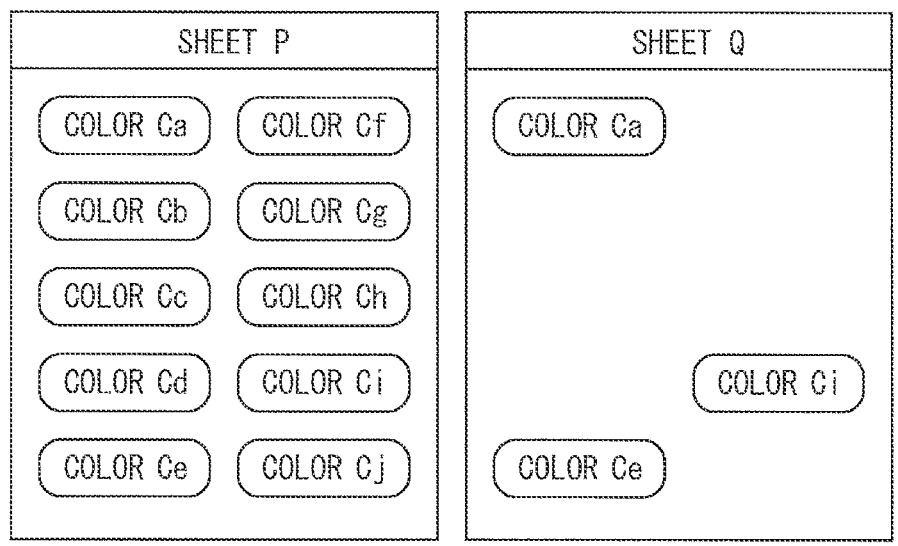
FIG. 2 is a diagram for describing an outline of the present invention.

Next, an outline of the present invention will be described with reference to FIG. 2. However, a case where printing paper is employed as the print medium and spectral reflectances are employed as colorimetric values will be described as an example. With reference to FIG. 2, it is assumed that a sheet P and a sheet Q are different types of printing paper, and colors Ca to Cj are different spot colors. FIG. 2 illustrates that spectral reflectances (colorimetric results of the patches of the CxF chart) of the 10 colors Ca to Cj are obtained for the sheet P, whereas spectral reflectances of only three colors Ca, Ce, and Ci are obtained for the sheet Q. In such a case, conventionally, when the spectral reflectances of, for example, the color Cb in the sheet Q are to be obtained, the printing and colorimetry of the CxF chart for the color Cb is performed using the sheet Q. On the other hand, in the present invention, a focus is placed on colors for which spectral reflectances for both the sheet P and the sheet Q are obtained (the three colors Ca, Ce, and Ci in the case illustrated in FIG. 2), and the spectral reflectances of the solid patch PA2 of the color Cb are predicted using a relationship between the sheet P and the sheet Q for those colors. At this time, a relationship (relationship between the sheet P and the sheet Q) for a color among three colors Ca, Ce, and Ci that is close to the color Cb is used. The spectral reflectances of the halftone patches PA3 are predicted using the relationships between the spectral reflectances of the solid patch PA2 and the spectral reflectances of the respective nine halftone patches PA3. As described above, in the present invention, the spectral reflectances of the solid patch PA2 and the halftone patches PA3 of the first type patches 71 are predicted. However, the predicted values of the spectral reflectances of the solid patch PA2 are calculated by a method different from a method for calculating the predicted values of the spectral reflectances of the halftone patches PA3. Since the spectral reflectances of the medium color patch PA1 are obtained by performing colorimetry of a portion in the sheet Q where an ink is not applied, the colorimetric result of the CxF chart for the color Ca and the like for the sheet Q can be used for the spectral reflectances of the medium color patch PA1.

Meanwhile, in the above case, information on the spectral reflectances in the sheet P is used to predict the spectral reflectances in the sheet Q. In such a case, the sheet Q is referred to as a "prediction target medium", and the sheet P is referred to as a "reference medium". Furthermore, a color that is a prediction target of the spectral reflectances of each patch of the CxF chart, such as the color Cb in the above case, is referred to as a "prediction target color".

An embodiment of the present invention will now be described with reference to the accompanying drawings. In the following description, a case in which the spectral reflectances are obtained in increments of 10 nm in the wavelength range from 380 nm to 730 nm (that is, a case where one color is specified by 36 spectral reflectances) will be described. However, the present invention is not limited to such a case, and the present invention can also be applied to a case where spectral reflectances of the number obtained by dividing a wavelength range including a range from 400 nm to 700 nm by a unit wavelength range of an appropriate size are obtained.

1. Overall Configuration of Printing System

Figure 3:
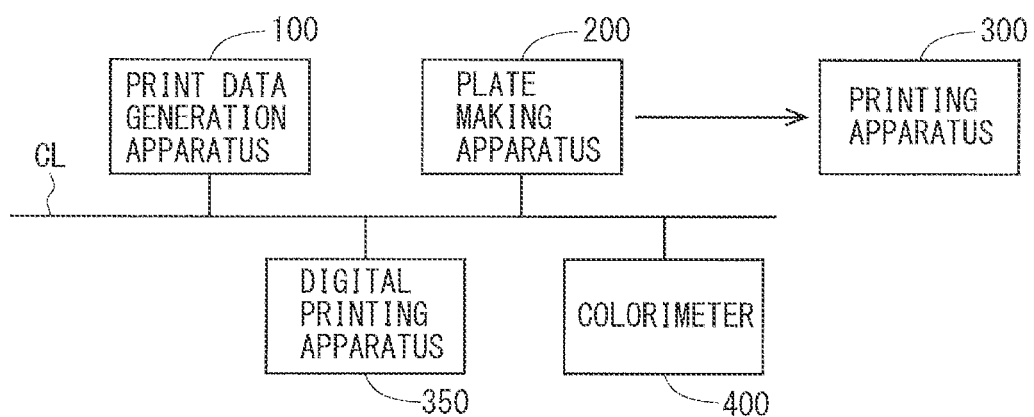
FIG. 3 is a diagram showing an overall configuration of a printing system according to one embodiment of the present invention.

FIG. 3 is a diagram showing an overall configuration of a printing system according to one embodiment of the present invention. The printing system includes: a print data generation apparatus 100 that generates print data by performing various processes on submitted data such as a PDF file; a plate making apparatus 200 that produces a printing plate on the basis of the print data; a printing apparatus 300 that performs printing using the printing plate manufactured by the plate making apparatus 200; a digital printing apparatus 350 such as an inkjet printer or copier that performs printing on the basis of the print data which is digital data without using the printing plate; and a colorimeter 400 for measuring a color. The print data generation apparatus 100, the plate making apparatus 200, the digital printing apparatus 350, and the colorimeter 400 are communicably interconnected by a communication line CL. Note that the colorimeter 400 used in the present embodiment is a spectral colorimeter.

In the present embodiment, the print data generation apparatus 100 performs a color prediction process for predicting a color of each patch when a CxF chart (color chart) is assumed to be created by applying an ink of a prediction target color (any spot color ink) on printing paper with ink densities of a plurality of levels. Specifically, the predicted values of the spectral reflectances of 10 patches (the solid patch PA2 and the 9 halftone patches PA3) excluding the medium color patch PA1 out of the 11 first type patches 71 are obtained by the color prediction process (see FIG. 1). However, as described above, the predicted values of the spectral reflectances of the solid patch PA2 and the predicted values of the spectral reflectances of the halftone patches PA3 are calculated by different methods. Note that the CxF chart to be predicted may be a simple CxF chart.

Further, the print data generation apparatus 100 performs an overprint prediction process for predicting a color obtained by overprinting inks of a plurality of colors (typically, a color of a portion where a plurality of spot color inks are overprinted or a portion where a spot color ink and a process color ink are overprinted). In the overprint prediction process, results of the color prediction process (predicted values of spectral reflectances) are used as necessary. Furthermore, the print data generation apparatus 100 also performs a process for converting the data obtained by the overprint prediction process into print data in a format that can be printed by the digital printing apparatus 350. It should be noted that, as a specific method of the overprint prediction process, the above-described Deshpande et al. method may be employed, or another method may be employed.

2. Configuration of Print Data Generation Apparatus

Figure 4:
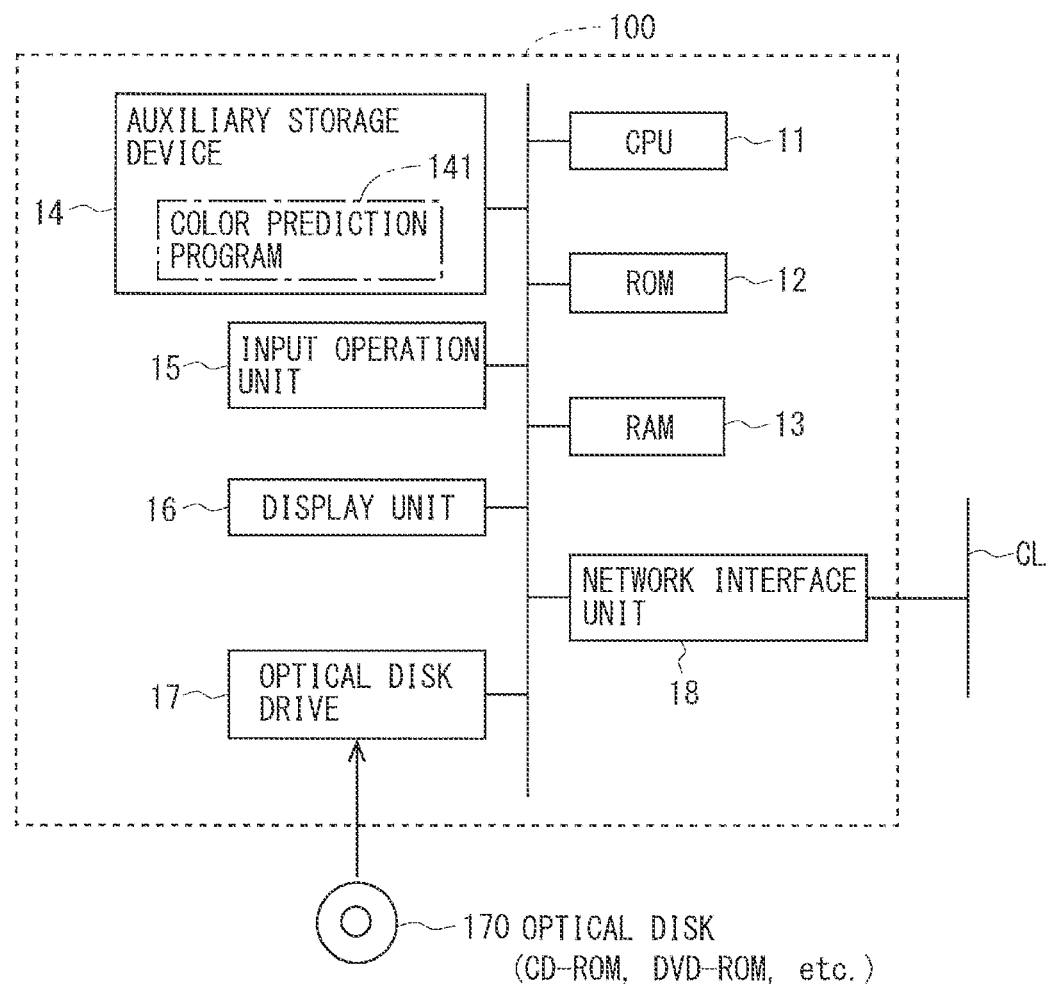
FIG. 4 is a diagram showing a hardware configuration of a print data generation apparatus in the embodiment.

FIG. 4 is a diagram showing a hardware configuration of the print data generation apparatus 100 in the present embodiment. The print data generation apparatus 100 is implemented by a personal computer, and includes a CPU 11, a ROM 12, a RAM 13, an auxiliary storage device 14, an input operation unit 15 such as a keyboard, a display unit 16, an optical disk drive 17, and a network interface unit 18. The submitted data transmitted through the communication line CL is inputted into the print data generation apparatus 100 via the network interface unit 18. Print data generated by the print data generation apparatus 100 is sent to the digital printing apparatus 350 through the communication line CL via the network interface unit 18.

A color prediction program 141 for performing the color prediction process is stored in the auxiliary storage device 14. The color prediction program 141 is provided by being stored in a computer readable recording medium such as a CD-ROM or a DVD-ROM. That is, a user purchases, for example, an optical disk (CD-ROM, DVD-ROM, etc.) 170 as a recording medium for the color prediction program 141, mounts the optical disk 170 on the optical disk drive 17, reads the color prediction program 141 from the optical disk 170, and installs the read program in the auxiliary storage device 14. Alternatively, the color prediction program 141 sent through the communication line CL may be received by the network interface unit 18 and installed in the auxiliary storage device 14.

3. Color Prediction Method

A color prediction process for implementing the color prediction method according to the present embodiment will now be described. This color prediction process is performed by executing the color prediction program 141 by the print data generation apparatus 100. For the prediction target color, it is necessary that the spectral reflectances of the solid patch PA2 in the reference medium are obtained. In other words, the print medium in which the spectral reflectances of the solid patch PA2 for the prediction target color are obtained is used as the reference medium when the color prediction process is performed.

Figure 5:
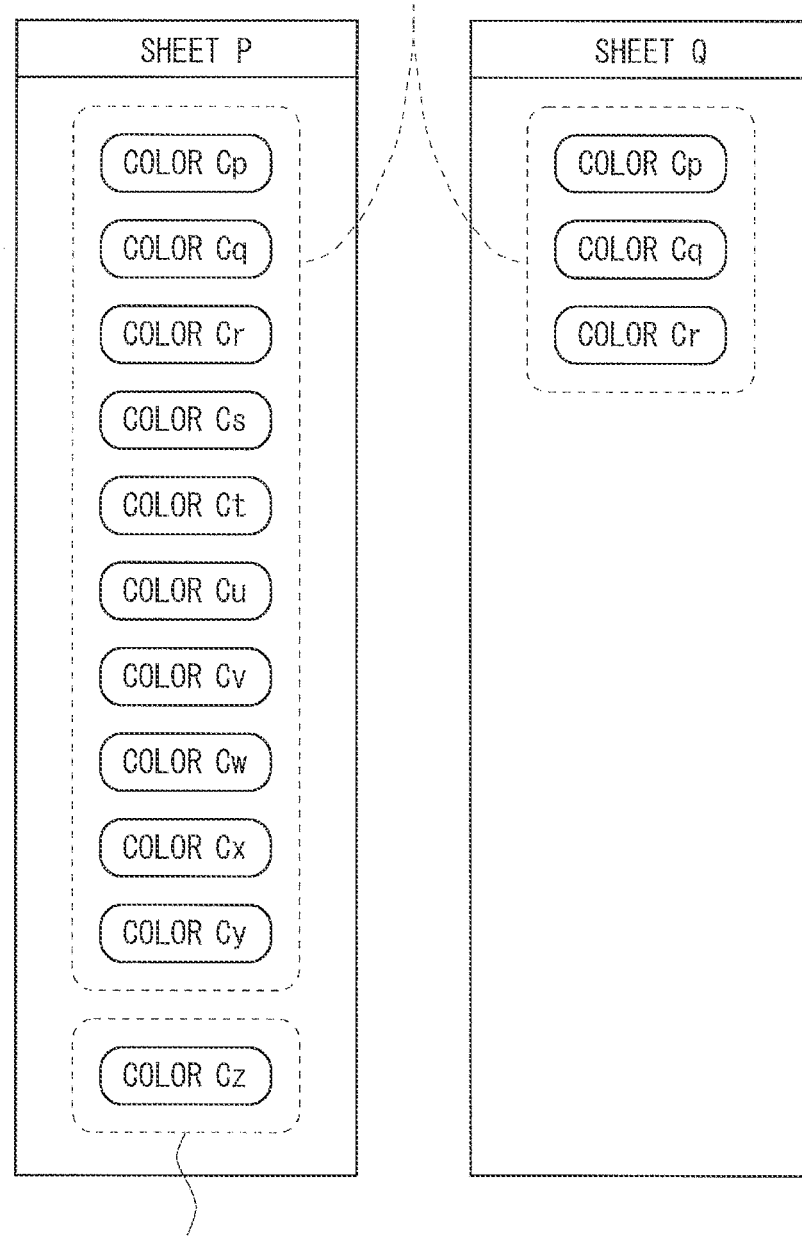
FIG. 5 is a diagram for describing one case on which an attention is focused in the embodiment.

Hereinafter, an example in which spectral reflectances of each patch of the CxF chart are predicted for the color Cz in the sheet Q in the case illustrated in FIG. 5 will be described as appropriate. In FIG. 5, the sheet P and the sheet Q are different types of printing paper, and the colors Cp to Cz are different spot colors. For the colors Cp to Cr, the spectral reflectances of all the first type patches 71 are obtained for both the sheet P and the sheet Q, and for the colors Cs to Cy and the color Cz, the spectral reflectances of all the first type patches 71 are obtained only for the sheet P. The sheet P is the reference medium, the sheet Q is the prediction target medium, and the color Cz is the prediction target color.

<3.1 General Procedure>

Figures 6, 7:
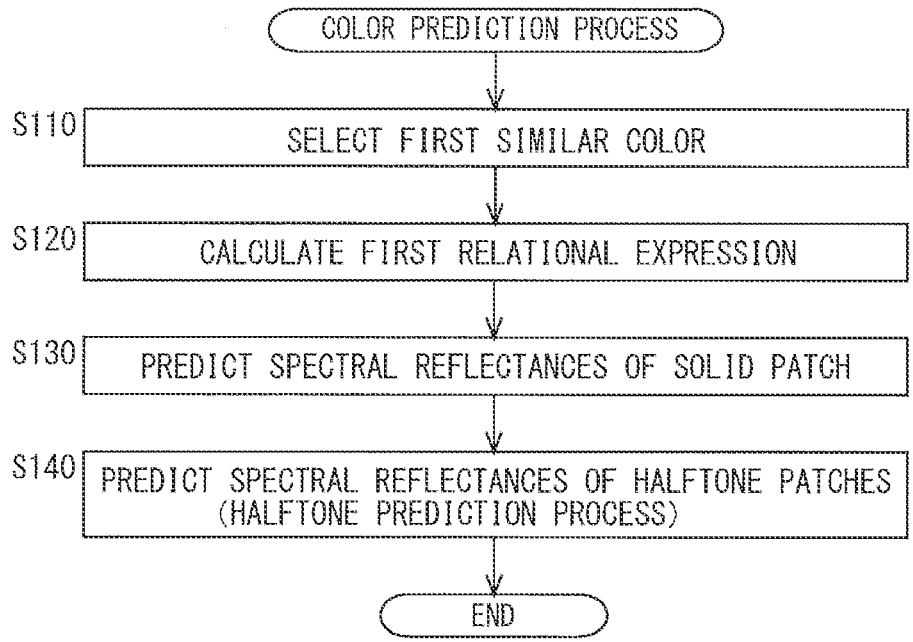
FIG. 6 is a flowchart showing a general procedure of a color prediction process in the embodiment.
FIG. 7 is a diagram for describing selection of a first similar color in the embodiment.

FIG. 6 is a flowchart showing a general procedure of the color prediction process according to the present embodiment. After the color prediction process is started, first, one color close to the prediction target color is selected as a first similar color from among colors for which spectral reflectances as colorimetric results have been obtained for both the reference medium and the prediction target medium (it is presumed that there are a plurality of such colors) (step S110). In the case illustrated in FIG. 5, the color closest to the color Cz is selected as the first similar color from among the three colors Cp, Cq, and Cr. Hereinafter, colors that can be candidates selected in step S110 (such a color for which spectral reflectances in the reference medium and spectral reflectances in the prediction target medium are obtained), such as the three colors Cp, Cq, and Cr in this example, are referred to as "similar candidate colors". In the present embodiment, as illustrated in FIG. 5, for the similar candidate color, it is assumed that spectral reflectances of all the first type patches 71 have been obtained for both the reference medium and the prediction target medium.

Next, for the first similar color selected in step 110, a relational expression representing the relationship between the spectral reflectances of the solid patch PA2 in the reference medium and the spectral reflectances of the solid patch PA2 in the prediction target medium is obtained (step S120). Note that the relational expression calculated in step S120 is referred to as a "first relational expression" to be distinguished from the relational expression calculated in step S210 (see FIG. 13) described later. In the case illustrated in FIG. 5, the first relational expression representing a relationship between the spectral reflectances of the solid patch PA2 in the sheet P and the spectral reflectances of the solid patch PA2 in the sheet Q is obtained for the color selected in step S110 among the three colors Cp, Cq, and Cr.

Next, the predicted values of the spectral reflectances of the solid patch PA2 in the prediction target medium for the prediction target color are obtained by applying the spectral reflectances of the solid patch PA2 in the reference medium for the prediction target color to the first relational expression obtained in step S120 (step S130). In the case illustrated in FIG. 5, the predicted values of the spectral reflectances of the solid patch PA2 in the sheet Q for the color Cz are obtained by applying the spectral reflectances of the solid patch PA2 in the sheet P for the color Cz to the first relational expression obtained in step S120.

Finally, the predicted values of the spectral reflectances of the halftone patches PA3 in the prediction target medium for the prediction target color are obtained using the predicted values obtained in step S130 (step S140). At this time, the relationship between the spectral reflectances of the solid patch PA2 and the spectral reflectances of each of the nine halftone patches PA3 is used. In the case illustrated in FIG. 5, the predicted values of the spectral reflectances of the nine halftone patches PA3 in the sheet Q for the color Cz are obtained based on the predicted values obtained in step S130 (the predicted values of the spectral reflectances of the solid patch PA2 in the sheet Q for the color Cz).

As described above, even if the CxF chart is not actually printed on the prediction target medium (sheet Q) using the ink of the prediction target color (color Cz), the spectral reflectances of all the first type patches 71 assuming that the CxF chart of the prediction target color (color Cz) is printed on the prediction target medium (sheet Q) are obtained. Now, the process of each step in FIG. 6 will be described in detail.

It should be noted that, in the present embodiment, a first similar color selection step is achieved by step S110, a first relational expression calculation step is achieved by step S120, a solid prediction step is achieved by step S130, and a halftone prediction step is achieved by step S140.

<3.2 Selection of First Similar Color>

First, the process for selecting the first similar color (the process in step S110 in FIG. 6) will be described in detail. In the present embodiment, the spectral reflectances data of each patch that forms the CxF chart is composed of 36 reflectances in increments of 10 nm in the wavelength range of 380 nm to 730 nm. Accordingly, regarding each color, the spectral reflectances data of the solid patch PA2 are composed of 36 reflectances in increments of 10 nm in the wavelength range of 380 nm to 730 nm. Therefore, a square error of the spectral reflectances of the solid patch PA2 between the prediction target color and each of the similar candidate colors is obtained based on 36 reflectances constituting the spectral reflectances data of the solid patch PA2 in the reference medium for the prediction target color and 36 reflectances constituting the spectral reflectances data of the solid patch PA2 in the reference medium for each of the similar candidate colors. Then, a similar candidate color for which a least square error is obtained is selected as the first similar color. As described above, in the present embodiment, the first similar color is selected using the least-squares method.

Here, a variable Ci (i is an integer of 1 or more) is used to distinguish a plurality of similar candidate colors from each other, and the spectral reflectances (36 reflectances) of the solid patch PA2 for the similar candidate color Ci are represented as Rs(i)(1) to Rs(i)(36) (see FIG. 7). Further, the spectral reflectances (36 reflectances) of the solid patch PA2 for the prediction target color are represented as Re(1) to Re(36). Then, the square error E(1) between the prediction target color and the first similar candidate color Cl is obtained by the following Equation (4).

$$E(1) = \sum_{j=1}^{36} \{Re(j) - Rs(1)(j)\}^2 \tag{4}$$

Similarly, the square error E(i) between the prediction target color and the ith similar candidate color Ci is obtained by the following Equation (5). Note that a weighting coefficient may be added for each wavelength.

$$E(i) = \sum_{j=1}^{36} \{Re(j) - Rs(i)(j)\}^2 \tag{5}$$

As described above, first, the square error E (i) for the spectral reflectances of the solid patch PA2 between the prediction target color and each of the plurality of similar candidate colors Ci is obtained. Then, the similar candidate color corresponding to the least value of the obtained square errors E(i) is selected as the first similar color. In this manner, in the present embodiment, the square error between the spectral reflectances of the solid patch PA2 in the reference medium for the prediction target color and the spectral reflectances of the solid patch PA2 in the reference medium for each similar candidate color is obtained, and the similar candidate color for which the least square error is obtained is selected as the first similar color.

Although the example in which the first similar color is selected using the least-squares method has been described above, the present invention is not limited to this example. The selection of the first similar color may be performed using a color difference. That is, the configuration may be such that a color difference between the prediction target color and each of the similar candidate colors is obtained and a similar candidate color for which a minimum color difference is obtained is selected as the first similar color. Regarding this, the color difference between the prediction target color and one similar candidate color is obtained as follows, for example. First, for each of the prediction target color and the similar candidate color, tristimulus values X, Y, and Z are obtained from the spectral reflectances of the solid patch PA2 in the reference medium using a predetermined calculation expression. Next, for each of the prediction target color and the similar candidate color, CIELAB values (L* value, a* value, and b* value) are obtained from the tristimulus values X, Y, and Z by a predetermined conversion expression. Next, for each of the L* value, the a* value, and the b* value, a difference between the prediction target color and the similar candidate color is obtained. The value (positive value) of the square root of the sum of squares of the three differences obtained in this manner is the color difference.

<3.2.1 Case where Plurality of Reference Media Exists>

In the meantime, for example, regarding the color for which the spectral reflectances in the sheet Q is to be predicted, the spectral reflectances in the sheet R may have already been obtained in addition to the spectral reflectances in the sheet P. That is, there may be a plurality of reference media. This will be described using a simple case illustrated in FIG. 8 as an example. In this case, the sheet P, the sheet Q, and the sheet R are different types of printing paper, and the colors Cp, Cq, Cr, Cz1, and Cz2 are different spot colors. For the color Cp, the spectral reflectances of all the first type patches 71 are obtained for the sheet P, the sheet Q, and the sheet R. For the color Cq, the spectral reflectances of all the first type patches 71 are obtained for the sheet Q and the sheet R. For the color Cr, the spectral reflectances of all the first type patches 71 are obtained for the sheet P and the sheet Q. The sheet Q is the prediction target medium, and the color Cz1 and the color Cz2 are the prediction target colors. For the color Cz1 and the color Cz2, the spectral reflectances of all the first type patches 71 are obtained for the sheet P and the sheet R.

Figure 8:
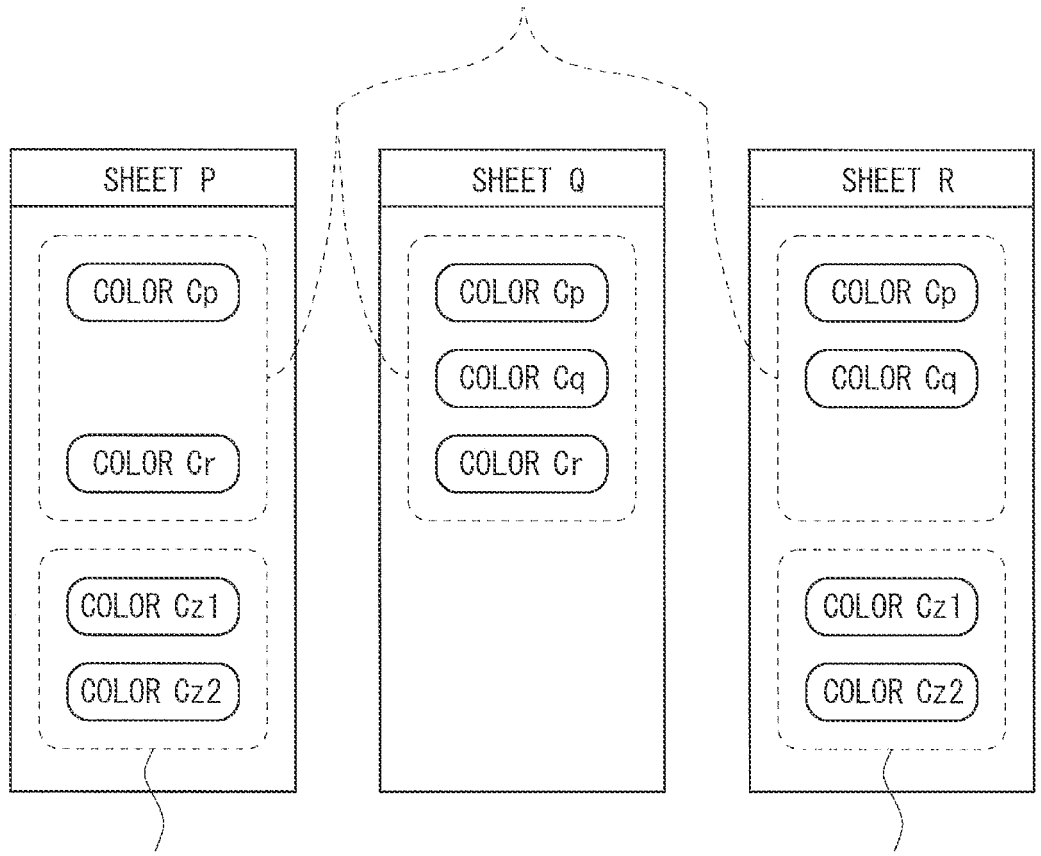
FIG. 8 is a diagram for describing a case where a plurality of reference media is present in the embodiment.

In the case illustrated in FIG. 8, regarding the prediction of the spectral reflectances of the solid patch PA2 in the sheet Q for the color Cz1, it is possible to use the relationship between the sheet P and the sheet Q for other colors, or to use the relationship between the sheet R and the sheet Q for other colors. Similarly, regarding the prediction of the spectral reflectances of the solid patch PA2 in the sheet Q for the color Cz2, it is possible to use the relationship between the sheet P and the sheet Q for other colors, or to use the relationship between the sheet R and the sheet Q for other colors. That is, there are a plurality of reference media for both the prediction for the color Cz1 and the prediction for the color Cz2. It should be noted that the calculation of the first relational expression (first relational expression representing the relationship between the spectral reflectances of the solid patch PA2 in the certain paper and the spectral reflectances of the solid patch PA2 in another paper) representing the relationship between the two sheets will be described in detail later.

In the case illustrated in FIG. 8, if the color Cz1 is close to each of the colors Cp, Cq, and Cr, regarding the prediction for the color Cz1, the relationship between the sheet P and the sheet Q for the color Cp can be used, the relationship between the sheet P and the sheet Q for the color Cr can be used, the relationship between the sheet R and the sheet Q for the color Cp can be used, or the relationship between the sheet R and the sheet Q for the color Cq can be used. Therefore, in order to specify the optimum relationship to use, in step S110 in FIG. 6, a square error between the spectral reflectances of the solid patch PA2 in the sheet P for the color Cz1 and the spectral reflectances of the solid patch PA2 in the sheet P for the color Cp, a square error between the spectral reflectances of the solid patch PA2 in the sheet P for the color Cz1 and the spectral reflectances of the solid patch PA2 in the sheet P for the color Cr, a square error between the spectral reflectances of the solid patch PA2 in the sheet R for the color Cz1 and the spectral reflectances of the solid patch PA2 in the sheet R for the color Cp, and a square error between the spectral reflectances of the solid patch PA2 in the sheet R for the color Cz1 and the spectral reflectances of the solid patch PA2 in the sheet R for the color Cq are calculated. That is, the square error is obtained for each combination of the similar candidate color and the reference medium. Then, based on the combination for which the least square error is obtained, a similar candidate color to be selected as the first similar color is determined, and a reference medium (hereinafter, the reference medium is referred to as a "target reference medium" for convenience) for which information on the spectral reflectances is to be used for obtaining predicted values of the spectral reflectances of the solid patch PA2 in the prediction target medium for the prediction target color is determined.

For example, with respect to the prediction for the color Cz1, it is assumed that the color Cr is selected as the first similar color and the sheet P is selected as the target reference medium. In this case, the relationship between the sheet P and the sheet Q for the color Cr is used for the prediction of the spectral reflectances of the solid patch PA2 in the sheet Q for the color Cz1. Furthermore, for example, with respect to the prediction for the color Cz2, it is assumed that the color Cq is selected as the first similar color and the sheet R is selected as the target reference medium. In this case, the relationship between the sheet R and the sheet Q for the color Cq is used for the prediction of the spectral reflectances of the solid patch PA2 in the sheet Q for the color Cz2.

As described above, when there are a plurality of reference media, all colors for which the spectral reflectances of at least the solid patch PA2 in any of the reference media and the spectral reflectances of at least the solid patch PA2 in the prediction target medium are obtained are set as similar candidate colors. Then, in step S110 in FIG. 6, in addition to the selection of the first similar color, the reference medium for which information on the spectral reflectances of the solid patch PA2 for the prediction target color is to be used in step S130 in FIG. 6 is selected as the target reference medium from among the plurality of reference media. At this time, a square error between the spectral reflectances of the solid patch PA2 in the reference medium for the prediction target color and the spectral reflectances of the solid patch PA2 in the reference medium for the similar candidate color is obtained for each combination of the similar candidate color and the reference medium. As a result, a similar candidate color and a reference medium included in the combination for which a least square error is obtained are respectively selected as the first similar color and the target reference medium.

If, in the case illustrated in FIG. 8, the color Cp is a color close to the color Cz1, and the square error between the spectral reflectances of the solid patch PA2 in the sheet R for the color Cz1 and the spectral reflectances of the solid patch PA2 in the sheet R for the color Cp is smaller than the square error between the spectral reflectances of the solid patch PA2 in the sheet P for the color Cz1 and the spectral reflectances of the solid patch PA2 in the sheet P for the color Cp, then the sheet R is selected as the target reference medium, in addition to the color Cp being selected as the first similar color.

When there are a plurality of reference media, in step S120 in FIG. 6, a relational expression representing the relationship between the spectral reflectances of the solid patch PA2 in the target reference medium among the plurality of reference media and the spectral reflectances of the solid patch PA2 in the prediction target medium is obtained as the first relational expression. For example, in step S120 in FIG. 6, with respect to the prediction for the color Cz1, it is assumed that the color Cr is selected as the first similar color and the sheet P is selected as the target reference medium. In this case, in step S120 in FIG. 6, an expression representing the relationship between the spectral reflectances of the solid patch PA2 in the sheet P for the color Cr and the spectral reflectances of the solid patch PA2 in the sheet Q for the color Cr is obtained as the first relational expression.

Although the example in which the first similar color and the target reference medium are selected based on the square error of the spectral reflectances has been described in the above description, the selection is not limited to this example. The first similar color and the target reference medium may be selected based on the color difference. That is, the configuration may be such that a color difference between the prediction target color and the similar candidate color is obtained based on the spectral reflectances of the solid patch PA2 in the reference medium for the prediction target color and the spectral reflectances of the solid patch PA2 in the reference medium for the similar candidate color for each combination of the similar candidate color and the reference medium, and then a similar candidate color and a reference medium included in the combination for which a minimum color difference is obtained is respectively selected as the first similar color and the target reference medium.

Furthermore, when selecting the first similar color and the target reference medium, the spectral reflectances of the medium color patch PA1 (the spectral reflectances of the print medium itself) may be considered. That is, the first similar color and the target reference medium may be selected in comprehensive consideration of the similarity between the prediction target color and the similar candidate color and the similarity between the prediction target medium and the reference medium. This can be realized, for example, as follows. In step S110 in FIG. 6, first, for each combination of the similar candidate color and the reference medium, the total similarity is obtained based on the color similarity representing the similarity (for example, the reciprocal of the square error between the two) between the spectral reflectances of the solid patch PA2 in the reference medium for the prediction target color and the spectral reflectances of the solid patch PA2 in the reference medium for the similar candidate color and the medium similarity representing the similarity (for example, the reciprocal of the square error between the two) between the spectral reflectances of the medium color patch PA1 in the reference medium and the spectral reflectances of the medium color patch PA1 in the prediction target medium. At this time, for example, the total similarity is obtained by the following expression (6) using K1 and K2 as coefficients.

$$\text{Total similarity} = \text{color similarity} \times K1 + \text{medium similarity} \times K2 \quad (6)$$

Then, in step S110 in FIG. 6, a similar candidate color and a reference medium included in the combination for which a maximum total similarity is obtained are respectively selected as the first similar color and the target reference medium.

<3.3 Calculation of First Relational Expression>

Figure 9:
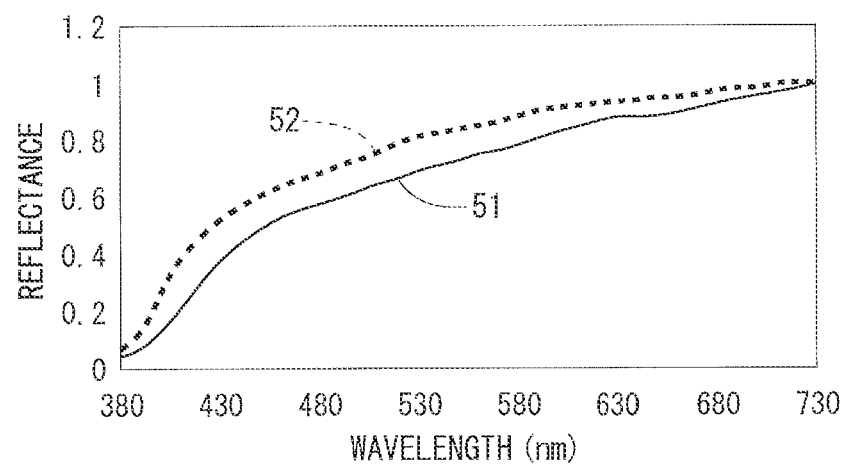
FIG. 9 is a diagram for describing calculation of a first relational expression in the embodiment.

Next, the process for obtaining the first relational expression (the process in step S120 in FIG. 6) will be described in detail. As described above, in the present embodiment, for the similar candidate color, the spectral reflectances of all the first type patches 71 are obtained for both the reference medium and the prediction target medium. Data of the spectral reflectances includes spectral reflectances data of the solid patch PA2. Therefore, in the case illustrated in FIG. 5, for the similar candidate color, the spectral reflectances of the solid patch PA2 in the sheet P and the spectral reflectances of the solid patch PA2 in the sheet Q are obtained. For a certain similar candidate color, for example, the spectral reflectances of the solid patch PA2 in the sheet P is represented as a curve denoted by reference numeral 51 in FIG. 9, and the spectral reflectances of the solid patch PA2 in the sheet Q is represented as a curve denoted by reference numeral 52 in FIG. 9. In FIG. 9, the horizontal axis represents wavelength (unit: nm), and the vertical axis represents reflectance.

Figure 10:
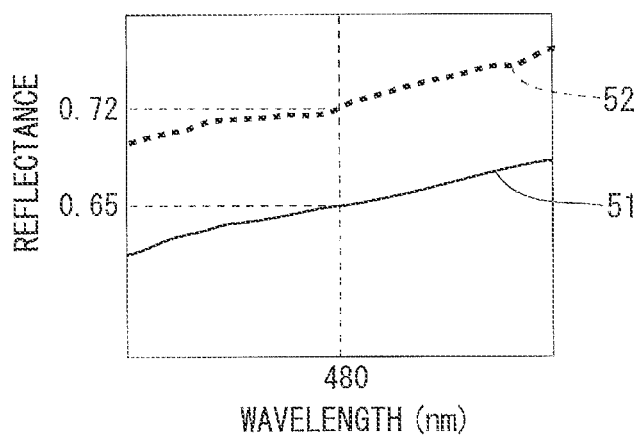
FIG. 10 is a diagram for describing combination data in the embodiment.
Figure 11:
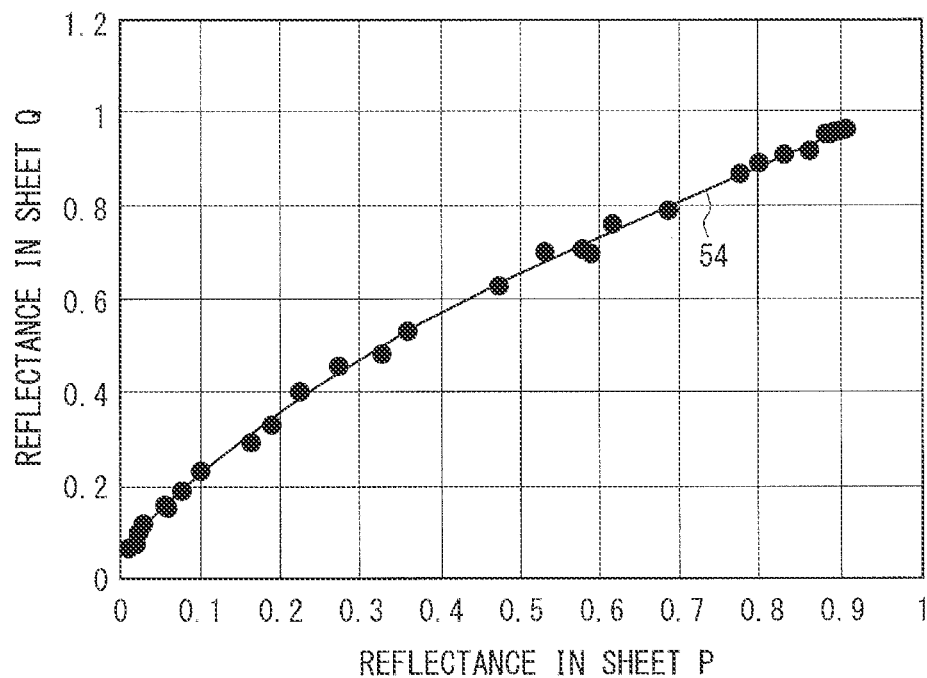
FIG. 11 is a diagram for describing calculation of the first relational expression in the embodiment.
Figure 12:
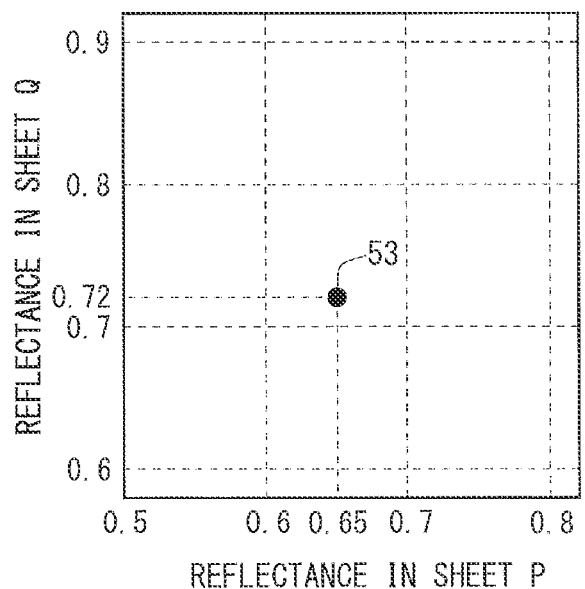
FIG. 12 is a diagram showing an example of one plot in the embodiment.

Here, regarding the graph illustrated in FIG. 9, it is assumed that curves for the sheet P and the sheet Q in the vicinity of a wavelength of 480 nm are as illustrated in FIG. 10. In this case, at a wavelength of 480 nm, the reflectance in the sheet P is 0.65, and the reflectance in the sheet Q is 0.72. Such data obtained by combining the reflectance in the sheet P and the reflectance in the sheet Q is treated as "combination data". Since the spectral reflectances data is configured by 36 reflectances as described above, 36 pieces of combination data are obtained for one similar candidate color. As shown in FIG. 11, each combination data is represented as one plot on a graph (hereinafter referred to as a "first relational graph" for convenience) in which the horizontal axis represents the reflectance in the sheet P and the vertical axis represents the reflectance in the sheet Q. For example, the combination data based on the data shown in FIG. 10 is represented as a plot denoted by reference numeral 53 in FIG. 12 on the first relational graph. Thus, in the present embodiment, 36 plots are presented on the first relational graph. The calculation of the first relational expression corresponds to obtaining a curve (for example, a curve denoted by reference numeral 54 in FIG. 11) passing through positions as close to the positions of these 36 plots as possible.

In view of the above, in the case illustrated in FIG. 5, in step S120 in FIG. 6, the first relational expression (approximate expression for obtaining an approximate value of the spectral reflectances of the solid patch PA2 in the sheet Q from the spectral reflectances of the solid patch PA2 in the sheet P) representing the relationship between the spectral reflectances of the solid patch PA2 in the sheet P and the spectral reflectances of the solid patch PA2 in the sheet Q is obtained based on the 36 pieces of combination data as described above. It should be noted that the first relational expression is obtained by a known method. For example, the first relational expression can be obtained by solving simultaneous equations obtained from the 36 pieces of combination data by Gaussian elimination or Gauss-Jordan elimination. As described above, the first relational expression is obtained for the first similar color (the similar candidate color selected in step S110).

As the first relational expression (approximate expression), for example, a quintic expression is adopted. As an example, a quintic expression such as the following expression (7) is adopted. In the following expression (7), y represents the reflectance of the solid patch PA2 in the sheet Q, and x represents the reflectance of the solid patch PA2 in the sheet P.

$$y=-0.321x^5+0.7136x^4-0.1681x^3-0.6897x^2+1.0892x+0.375 \quad (7)$$

Although the example in which the quintic expression is employed as the first relational expression (approximate expression) has been described in the above description, the present invention is not limited to this example. An expression of degree n in which n is an integer of 2 or more may be adopted as the first relational expression. In this regard, the degree of the first relational expression may be determined depending on the similar candidate color selected as the first similar color in step S110. For example, regarding a color with a narrow numerical range of the spectral reflectances in the sheet P, if a first relational expression of higher degree is used, the overfitting may be caused and approximation accuracy may deteriorate. Therefore, for such a color (similar candidate color), the degree of the first relational expression is lowered, by which it is possible to suppress the deterioration of the approximation accuracy due to overfitting.

In addition, as the first relational expression (approximate expression), an expression expressed using a power function may be adopted. In this case, for example, the values of variables A and B in the following expression (8) are obtained based on the above-described combination data (data represented as a plot on the first relational graph). An expression reflecting the values of the variables A and B is used as the first relational expression. In the following expression (8), y represents the reflectance of the solid patch PA2 in the sheet Q, and x represents the reflectance of the solid patch PA2 in the sheet P.

$$y=Ax^B \quad (8)$$

As described above, in step S120 in FIG. 6, for the first similar color (the similar candidate color selected in step S110), the first relational expression representing the relationship between the spectral reflectances of the solid patch PA2 in the reference medium and the spectral reflectances of the solid patch PA2 in the prediction target medium is obtained.

<3.4 Prediction of Spectral Reflectances of Solid Patch>

Next, the process of predicting the spectral reflectances of the solid patch PA2 in the prediction target medium for the prediction target color (the process of step S130 in FIG. 6) will be described in detail. At the start of the process of step S130, for the first similar color selected in step S110, a quintic expression such as the above expression (7) is obtained as the first relational expression representing the relationship between the spectral reflectances of the solid patch PA2 in the reference medium and the spectral reflectances of the solid patch PA2 in the prediction target medium. Further, as described above, the spectral reflectances data is composed of 36 reflectances. Therefore, in step S130, 36 reflectances as the spectral reflectances data of the solid patch PA2 in the prediction target medium for the prediction target color are obtained, by substituting 36 reflectances, which are the spectral reflectances data of the solid patch PA2 in the reference medium for the prediction target color, one by one into the first relational expression obtained in step S120. In the case illustrated in FIG. 5, 36 reflectances, which are the spectral reflectances data of the solid patch PA2 in the sheet P for the color Cz, are substituted into the first relational expression obtained in step S120 one by one, so that 36 reflectances, which are the spectral reflectances data of the solid patch PA2 in the sheet Q for the color Cz, are obtained.

<3.5 Prediction of Spectral Reflectances of Halftone Patch>

Figure 14:
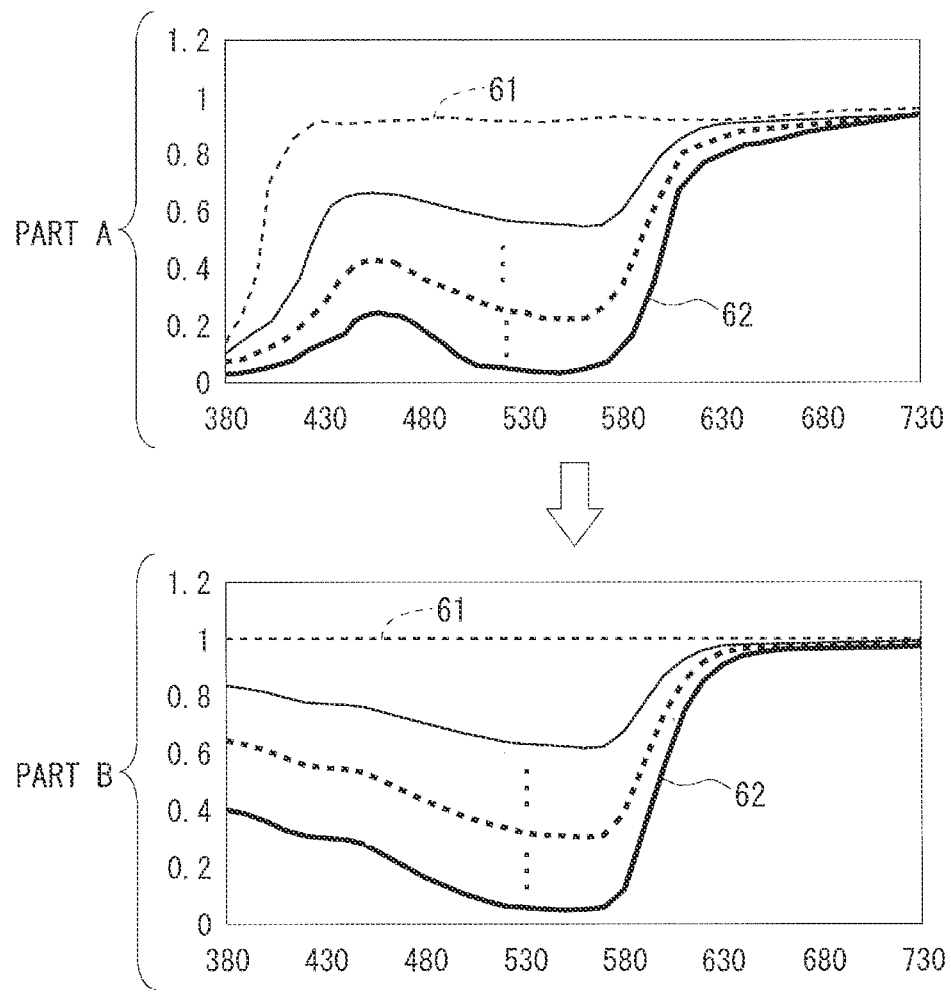
FIG. 14 is a diagram for describing calculation of second relational expressions in the embodiment.
Figure 15:
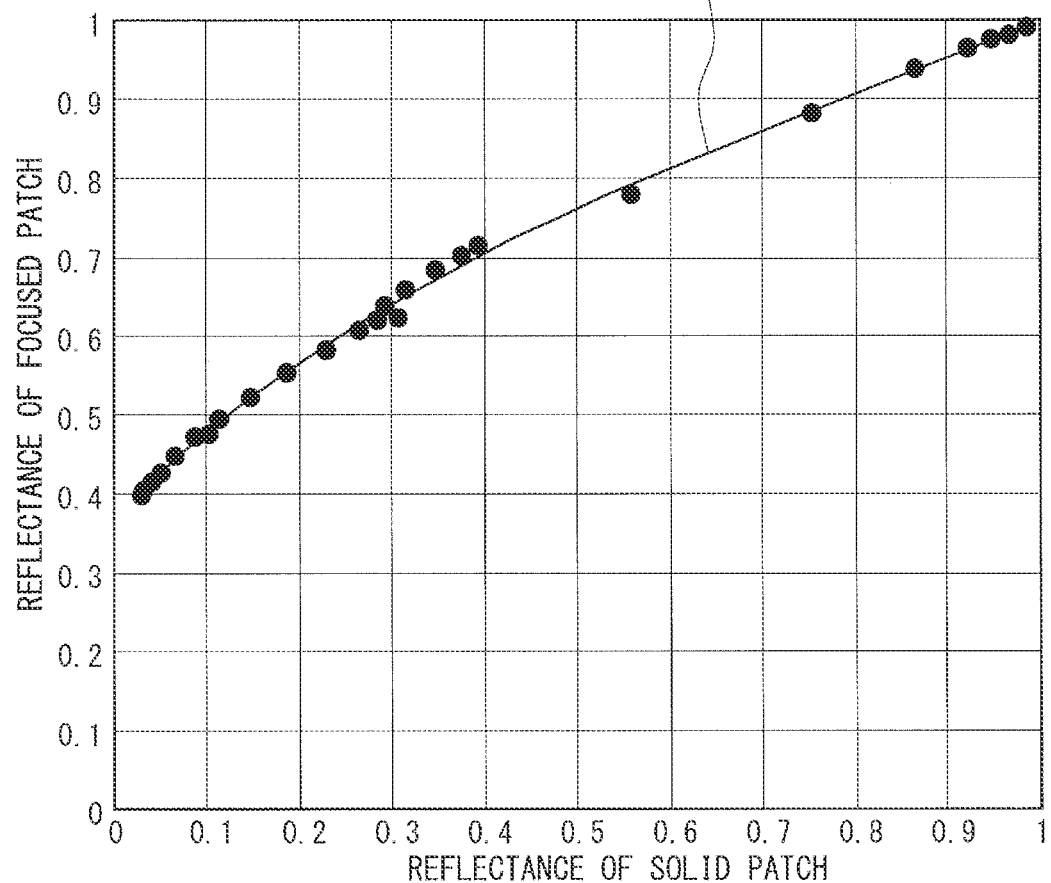
FIG. 15 is a diagram for describing calculation of the second relational expressions in the embodiment.

Next, with reference to FIGS. 13 to 15, the process of predicting the spectral reflectances of the halftone patches PA3 in the prediction target medium for the prediction target color (the process of step S140 in FIG. 6) (hereinafter, referred to as a "halftone prediction process") will be described in detail. In the meantime, when a plurality of spot colors having similar hues are focused, it is considered that, regarding each halftone patch PA3, the spectral reflectances of the plurality of spot colors are close to each other. If the same print medium is used at the time of printing, the spectral reflectances of the solid patch PA2 and the spectral reflectances of each halftone patch PA3 are considered to have a certain relationship. Therefore, in the halftone prediction process according to the present embodiment, the "relationships between the spectral reflectances of the solid patch PA2 and the spectral reflectances of respective halftone patches PA3" in the prediction target medium for the first similar color selected in step S110 in FIG. 6 are used to obtain the predicted values of the spectral reflectances of the nine halftone patches PA3 in the prediction target medium for the prediction target color, from the predicted values of the spectral reflectances of the solid patch PA2 in the prediction target medium for the prediction target color (the predicted values obtained in step S130 in FIG. 6).

Figure 13:
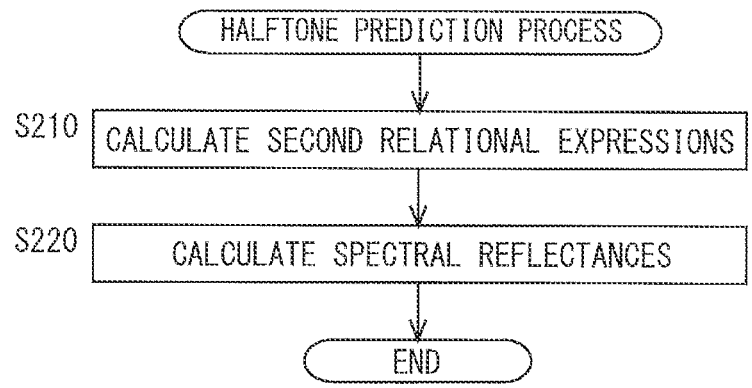
FIG. 13 is a flowchart showing a procedure of a halftone prediction process in the embodiment.

FIG. 13 is a flowchart showing a procedure of the halftone prediction process according to the present embodiment. In the case illustrated in FIG. 5, first, second relational expressions (approximate expressions) each representing the relationship between the spectral reflectances of the solid patch PA2 in the sheet Q and the spectral reflectances of the halftone patch PA3 in the sheet Q are obtained for the color selected in step S110 in FIG. 6 among the three colors Cp, Cq, and Cr (step S210). Since there are nine halftone patches PA3 (see FIG. 1), nine second relational expressions are obtained by the processing in step S210. Note that the first relational expression obtained in step S120 in FIG. 6 is a relational expression representing the relationship between the spectral reflectances of the solid patch PA2 in the sheet P and the spectral reflectances of the solid patch PA2 in the sheet Q. Therefore, the first relational expression and the second relational expressions are completely different. Hereinafter, the calculation of the second relational expression in step S210 will be described in further detail.

In the case illustrated in FIG. 5, the spectral reflectances of all the first type patches 71 in the sheet Q are obtained for all the three colors Cp, Cq, and Cr. Therefore, the spectral reflectances of all the first type patches 71 in the sheet Q are obtained for the first similar color selected in step S110 in FIG. 6. That is, regarding the first similar color, data corresponding to curves (curves representing spectral reflectances) as schematically shown in part A in FIG. 14 is obtained for all the first type patches 71 in the sheet Q (in FIG. 14, the horizontal axis represents wavelength (unit: nm), and the vertical axis represents reflectance). It should be noted that part A in FIG. 14 shows only curves corresponding to four patches in the first type patches 71 (the same applies to part B in FIG. 14). The curve denoted by reference numeral 61 is a curve for the medium color patch PA1, and the curve denoted by reference numeral 62 is a curve for the solid patch PA2. Such data is normalized so that the spectral reflectances of the medium color patch PA1 are 1. As a result, data corresponding to curves (curves representing spectral reflectances) as schematically shown in part B in FIG. 14 is obtained (note that a straight line is obtained for the medium color patch PA1 that is the reference for normalization).

Here, one patch (hereinafter referred to as a "focused patch") out of nine halftone patches PA3 is focused. The relationship between the reflectances of the solid patch PA2 and the reflectances of the focused patch is represented by a graph as illustrated in FIG. 15, for example, similarly to the relationship between the reflectances in the sheet P and the reflectances in the sheet Q (see FIG. 11). Therefore, in the present embodiment, an approximate expression representing the relationship between the spectral reflectances of the solid patch PA2 and the spectral reflectances of the focused patch is obtained as the second relational expression, similarly to step S120 in FIG. 6.

As described above, in step S210, the second relational expression representing the relationship between the spectral reflectances of the solid patch PA2 in the prediction target medium and the spectral reflectances of each of the plurality of halftone patches PA3 in the prediction target medium (an approximate expression for obtaining approximate values of the spectral reflectances of each of the halftone patches PA3 in the prediction target medium from the spectral reflectances of the solid patch PA2 in the prediction target medium) is obtained for the first similar color.

In the case illustrated in FIG. 5, after the second relational expressions are calculated in step S210, the predicted values of the spectral reflectances of the respective halftone patches PA3 in the sheet Q for the color Cz are obtained by applying the predicted values of the spectral reflectances of the solid patch PA2 in the sheet Q for the color Cz (the predicted value obtained in step S130 in FIG. 6) to the second relational expressions obtained in step S210 (step S220). Since there are nine halftone patches PA3, the spectral reflectances of the solid patch PA2 for the color Cz are applied to the nine second relational expressions. More specifically, for each of the halftone patches PA3, 36 reflectances, which are the spectral reflectances data of the solid patch PA2 in the sheet Q for the color Cz, are substituted into a corresponding second relational expression (second relational expression representing relationship between the spectral reflectances of the solid patch PA2 and the spectral reflectances of the corresponding halftone patch PA3) one by one, so that 36 reflectances, which are the spectral reflectances data of the corresponding halftone patch PA3 in the sheet Q for the color Cz, are obtained. In this manner, for the color Cz, the predicted values of the spectral reflectances of each of the nine halftone patches PA3 in the sheet Q are obtained.

As described above, in step S220, the predicted values of the spectral reflectances of each halftone patch PA3 in the prediction target medium for the prediction target color are calculated by applying the predicted values obtained in step S130 in FIG. 6 to the second relational expression.

In the present embodiment, when the second relational expressions are calculated in step S210, normalization is performed so that the spectral reflectances of the medium color patch PA1 are 1. Therefore, the 36 reflectances obtained from the second relational expression are subjected to denormalization (process for returning the normalized data to the data that has not been normalized) based on the actual spectral reflectances of the medium color patch PA1.

In the present embodiment, a second relational expression calculation step is achieved by step S210, and a predicted value calculation step is achieved by step S220.

<3.6 Prediction of Spectral Reflectances of Second Type Patch>

Although the prediction of the spectral reflectances of the first type patches 71 has been described above, the relationship between the two sheets for the color close to the prediction target color can be used for prediction of the spectral reflectances of the second type patches 72 in the same manner as described above.

Further, in a case where the optical characteristics, ink bleeding, and the like are remarkably similar between the reference medium and the prediction target medium, the spectral reflectances of the second type patches 72 in the reference medium for the prediction target color may be directly treated as the predicted values of the spectral reflectances of the second type patches 72 in the prediction target medium for the prediction target color.

Moreover, in a case where the prediction target color and the first similar color (a second similar color, in a first modification described later) are remarkably close to each other, the spectral reflectances of the second type patches 72 in the prediction target medium for the first similar color (the second similar color, in the first modification described later) may be directly treated as the predicted values of the spectral reflectances of the second type patches 72 in the prediction target medium for the prediction target color.

Furthermore, when a method of directly treating the spectral reflectances of the second type patches 72 in the reference medium for the prediction target color as the predicted values of the spectral reflectances of the second type patches 72 in the prediction target medium for the prediction target color is defined as a "first method", and a method of directly treating the spectral reflectances of the second type patches 72 in the prediction target medium for the first similar color (the second similar color, in the first modification described later) as the predicted values of the spectral reflectances of the second type patches 72 in the prediction target medium for the prediction target color is defined as a "second method", which one of the first method and the second method is adopted may be determined by comprehensively considering the similarity between the prediction target color and the first similar color (the second similar color, in the first modification described later) and the similarity between the prediction target medium and the reference medium. For example, which one of the first method and the second method is adopted may be determined based on a result of comparison between a value obtained by multiplying a similarity (for example, the reciprocal of the square error between the two) between the spectral reflectances of the solid patch PA2 in the reference medium for the prediction target color and the spectral reflectances of the solid patch PA2 in the reference medium for the first similar color by a predetermined coefficient (first coefficient), and a value obtained by multiplying a similarity (for example, the reciprocal of the square error between the two) between the spectral reflectances of the medium color patch PA1 in the reference medium and the spectral reflectances of the medium color patch PA1 in the prediction target medium by a predetermined coefficient (second coefficient).

4. Effects

According to the present embodiment, the predicted values of the spectral reflectances of the solid patch PA2 in the prediction target medium for the prediction target color are obtained by applying the spectral reflectances of the solid patch PA2 in the reference medium for the prediction target color to the first relational expression representing the relationship between the reference medium and the prediction target medium (relationship between the spectral reflectances of the solid patch PA2 in the reference medium and the spectral reflectances of the solid patch PA2 in the prediction target medium) for a color (first similar color) close to the prediction target color. In addition, based on the above predicted values, the predicted values of the spectral reflectances of the halftone patches PA3 in the prediction target medium for the prediction target color are obtained. As described above, the spectral reflectances for the prediction target color are predicted using the relationship between the reference medium and the prediction target medium for a color close to the prediction target color. Therefore, unlike the invention disclosed in Japanese Laid-Open Patent Publication No. 2014-27571, the spectral reflectances can be accurately predicted without requiring a large number of pieces of teaching data. From the above, according to the present embodiment, it is possible to predict, based on a colorimetric result of a CxF chart in a certain print medium, a color of each patch of the CxF chart when another print medium is used, at low cost and with high accuracy.

5. Modifications

Hereinafter, modifications of the embodiment will be described.

<5.1 Similar Color>
<5.1.1 First Modification>

In the embodiment, the spectral reflectances information of the color selected as the first similar color for use in the prediction of the spectral reflectances of the solid patch PA2 is also used in the prediction of the spectral reflectances of the halftone patches PA3. Specifically, when the predicted values of the spectral reflectances of the halftone patches PA3 in the prediction target medium for the prediction target color are obtained, the "relationships between the spectral reflectances of the solid patch PA2 and the spectral reflectances of respective halftone patches PA3" in the prediction target medium for the first similar color selected in step S110 in FIG. 6 is used. However, the present invention is not limited to this example. It is also possible to use spectral reflectances information of different colors when the predicted values of the spectral reflectances of the solid patch PA2 are obtained and when the predicted values of the spectral reflectances of the halftone patches PA3 are obtained.

In this regard, in the present modification, when the predicted values of the spectral reflectances of the solid patch PA2 are obtained, color information in which the spectral reflectances of all the first type patches 71 are obtained for both the reference medium and the prediction target medium is used. On the other hand, when the predicted values of the spectral reflectances of the halftone patches PA3 are obtained, color information in which the spectral reflectances of all the first type patches 71 are obtained at least for the prediction target medium is used. In other words, for a color whose information is used when the predicted values of the spectral reflectances of the halftone patches PA3 are obtained, information on the spectral reflectances in the reference medium may not be obtained at all.

Figure 16:
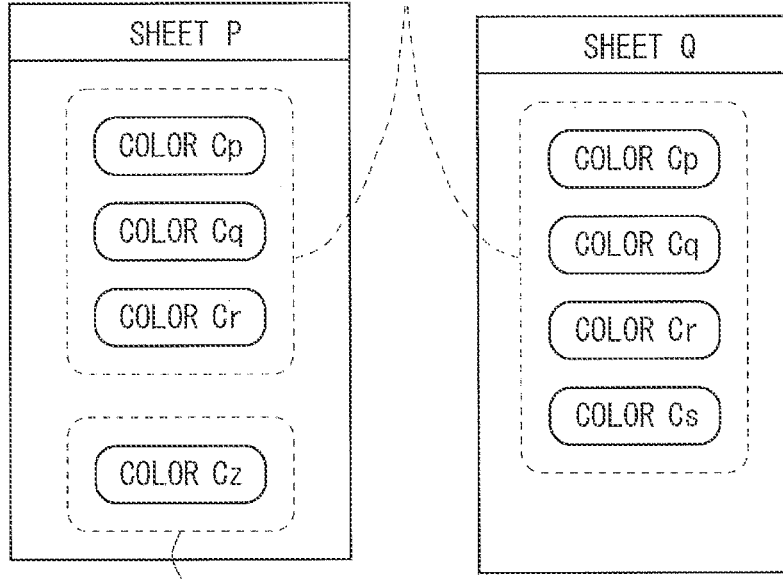
FIG. 16 is a diagram relating to a first modification of the embodiment, describing one case in which a color used in predicting spectral reflectances of a solid patch is different from a color used in predicting spectral reflectances of a halftone patch.

For example, a case as illustrated in FIG. 16 is assumed. In this case, for the colors Cp, Cq, and Cr, the spectral reflectances of all the first type patches 71 are obtained for both the sheet P and the sheet Q, and for the color Cs, the spectral reflectances of all the first type patches 71 are obtained only for the sheet Q. The sheet P is the reference medium, the sheet Q is the prediction target medium, and the color Cz is the prediction target color. In the present modification, in such a case, information of the spectral reflectances of the color closest to the color Cz among the colors Cp, Cq, and Cr is used when the predicted values of the spectral reflectances of the solid patch PA2 are obtained, and information of the spectral reflectances of the color closest to the color Cz among the colors Cp, Cq, Cr, and Cs is used when the predicted values of the spectral reflectances of the halftone patches PA3 are obtained. For example, if the color Cr among the colors Cp, Cq, and Cr is the color closest to the color Cz, information on the spectral reflectances of the color Cr is used when the predicted values of the spectral reflectances of the solid patch PA2 are obtained, and if the color Cs among the colors Cp, Cq, Cr, and Cs is the color closest to the color Cz, information on the spectral reflectances of the color Cs is used when the predicted values of the spectral reflectances of the halftone patches PA3 are obtained. A procedure of the halftone prediction process for realizing this will be described below.

Figure 17:
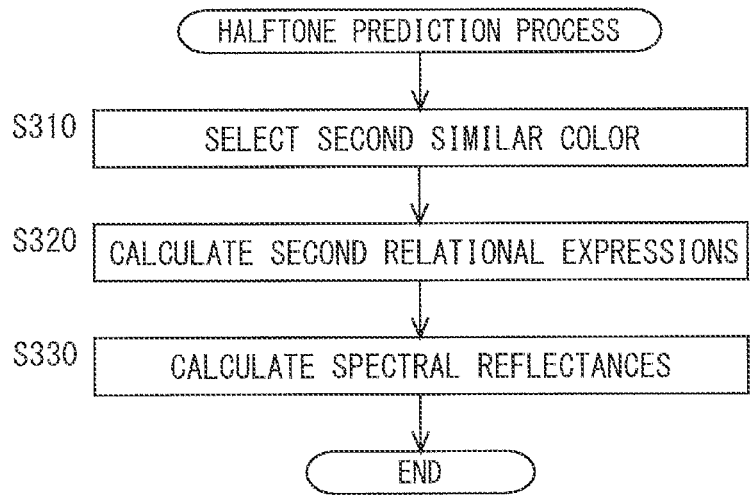
FIG. 17 is a flowchart showing a procedure of a halftone prediction process in the first modification of the embodiment.

FIG. 17 is a flowchart showing the procedure of the halftone prediction process in the present modification. After the halftone prediction process is started, first, one color close to the prediction target color is selected as the second similar color from a plurality of sample colors that are colors (it is presumed that there are a plurality of such colors) for which spectral reflectances of all the first type patches 71 in the prediction target medium have been obtained (step S310). As a specific method of selecting the second similar color from the plurality of sample colors, a method similar to the method of selecting the first similar color from the plurality of similar candidate colors can be adopted.

Next, the second relational expressions each representing the relationship between the spectral reflectances of the solid patch PA2 in the prediction target medium and the spectral reflectances of each of the plurality of halftone patches PA3 in the prediction target medium (approximate expressions each for obtaining approximate values of the spectral reflectances of each of the halftone patches PA3 in the prediction target medium from the spectral reflectances of the solid patch PA2 in the prediction target medium) is obtained for the color selected in step S310 (second similar color) (step S320). A specific method for obtaining the second relational expression is the same as that in the above embodiment.

Finally, similarly to the above embodiment, the predicted values of the spectral reflectances of the respective halftone patches PA3 in the prediction target medium for the prediction target color are calculated by applying the predicted values of the spectral reflectances of the solid patch PA2 in the prediction target medium for the prediction target color (the predicted values obtained in step S130 in FIG. 6) to the second relational expressions obtained in step S320 (step S330).

In the present modification, a second similar color selection step is achieved by step S310, the second relational expression calculation step is achieved by step S320, and the predicted value calculation step is achieved by step S330.

According to the present modification, it is possible to accurately predict the colors of the halftone patches PA3 as compared with the above-described embodiment.

<5.1.2 Second Modification>

In the above embodiment, it is assumed that for the similar candidate color, the spectral reflectances of all the first type patches 71 are obtained for both the reference medium and the prediction target medium. However, the present invention is not limited to this example. A color for which the spectral reflectances of at least the solid patch PA2 are obtained for both the reference medium and the prediction target medium can be adopted as the similar candidate color.

Figure 18:
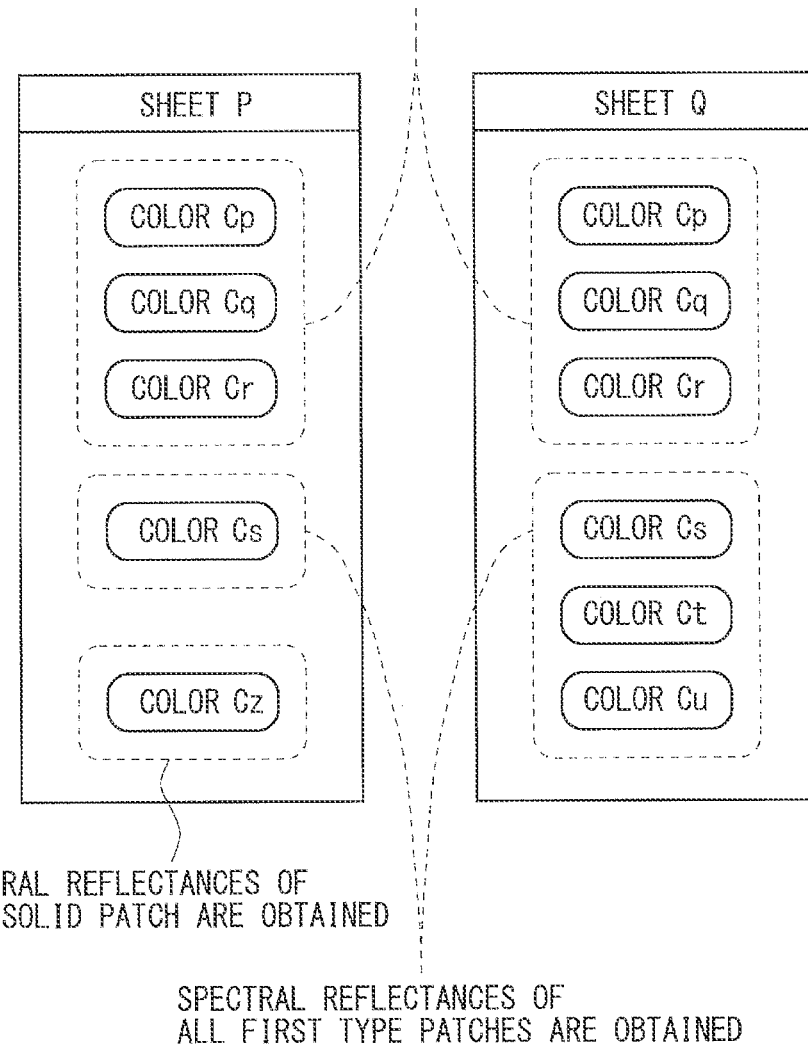
FIG. 18 is a diagram relating to a second modification of the embodiment, describing one case in which colors for which spectral reflectances of only the solid patch are obtained for both a reference medium and a prediction target medium are adopted as similar candidate colors.

In this regard, for example, a case as illustrated in FIG. 18 is assumed. In this case, for the colors Cp, Cq, and Cr, the spectral reflectances of only the solid patch PA2 are obtained for both the sheet P and the sheet Q, for the color Cs, the spectral reflectances of all the first type patches 71 are obtained for both the sheet P and the sheet Q, and for the colors Ct and Cu, the spectral reflectances of all the first type patches 71 are obtained only for the sheet Q. The sheet P is the reference medium, the sheet Q is the prediction target medium, and the color Cz is the prediction target color. In the present modification, in such a case, information of the spectral reflectances of the color closest to the color Cz among the colors Cp, Cq, Cr, and Cs is used when the predicted values of the spectral reflectances of the solid patch PA2 are obtained, and information of the spectral reflectances of the color closest to the color Cz among the colors Cs, Ct, and Cu is used when the spectral reflectances of the halftone patches PA3 are predicted. For example, if the color Cr among the colors Cp, Cq, Cr, and Cs is the color closest to the color Cz, information on the spectral reflectances of the color Cr is used when the predicted values of the spectral reflectances of the solid patch PA2 are obtained, and if the color Ct among the colors Cs, Ct, and Cu is the color closest to the color Cz, information on the spectral reflectances of the color Ct is used when the predicted values of the spectral reflectances of the halftone patches PA3 are obtained.

In the present modification, in step S110 in FIG. 6, colors for which the spectral reflectances of at least the solid patch PA2 are obtained for both the reference medium and the prediction target medium are set as the similar candidate color (it is presumed that there are a plurality of such colors). Specifically, in step S110 in FIG. 6, a print medium in which the spectral reflectances of the solid patch PA2 for the prediction target color are obtained is used as the reference medium, and a plurality of colors for which the spectral reflectances of at least the solid patch PA2 are obtained for both the reference medium and the prediction target medium are set as a plurality of similar candidate colors, and a color close to the prediction target color is selected as the first similar color from the plurality of similar candidate colors. Then, in step S120 in FIG. 6, for the first similar color selected in step S110, the first relational expression representing the relationship between the spectral reflectances of the solid patch PA2 in the reference medium and the spectral reflectances of the solid patch PA2 in the prediction target medium is obtained. The spectral reflectances of the solid patch PA2 are predicted in the same manner as in the above embodiment. The prediction of the spectral reflectances of the halftone patches PA3 (halftone prediction process) is performed in the same manner as in the first modification.

<5.2 Regarding Spectral Characteristics to be Used>
<5.2.1 Third Modification>

In the above embodiment, the color prediction process is performed using spectral reflectances. However, the present invention is not limited thereto, and the color prediction process may be performed using spectral characteristics other than spectral reflectances. Examples of spectral characteristics other than spectral reflectances include spectral absorption factors (values each obtained by subtracting the spectral reflectance from 1) and spectral absorption coefficients α each obtained from the following Equation (9). When the reflectance of paper white at a certain wavelength is $R_0$, the reflectance of the corresponding patch is R, and the thickness of the ink is x, the spectral absorption coefficient α is expressed by the following Equation (9) when multiple reflection is not considered.

$$\alpha = -(1/(2x)) \cdot \ln(R/R_0) \tag{9}$$

<5.2.2 Fourth Modification>

In the embodiment, for the first similar color, an expression representing the relationship between the spectral reflectances of the solid patch PA2 in the reference medium and the spectral reflectances of the solid patch PA2 in the prediction target medium is used as the first relational expression. However, the present invention is not limited to this example. For example, an expression representing a relationship between the spectral absorption factors of the solid patch PA2 in the reference medium and the spectral absorption factors of the solid patch PA2 in the prediction target medium, or an expression representing a relationship between the spectral reflectances of the solid patch PA2 in the reference medium and the spectral absorption factors of the solid patch PA2 in the prediction target medium may be used as the first relational expression. Similarly, the second relational expression is not limited to the expression representing the relationship between the spectral reflectances of the solid patch PA2 in the prediction target medium and the spectral reflectances of the halftone patches PA3 in the prediction target medium.

<5.3 Overall Processing Procedure (Fifth Modification)>

Figure 19:
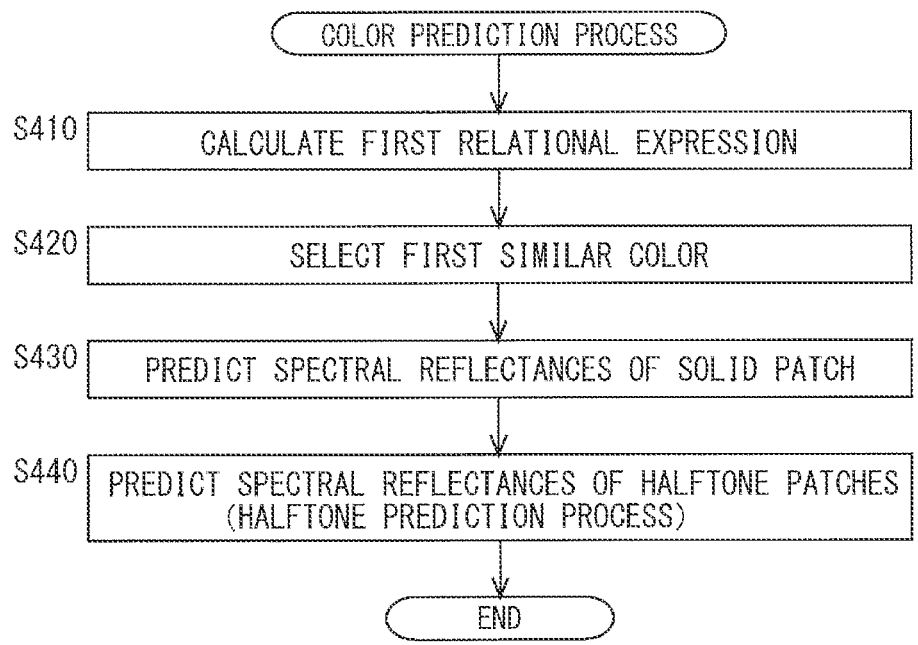
FIG. 19 is a flowchart showing a general procedure of a color prediction process according to a fifth modification of the embodiment.
Figure 20:
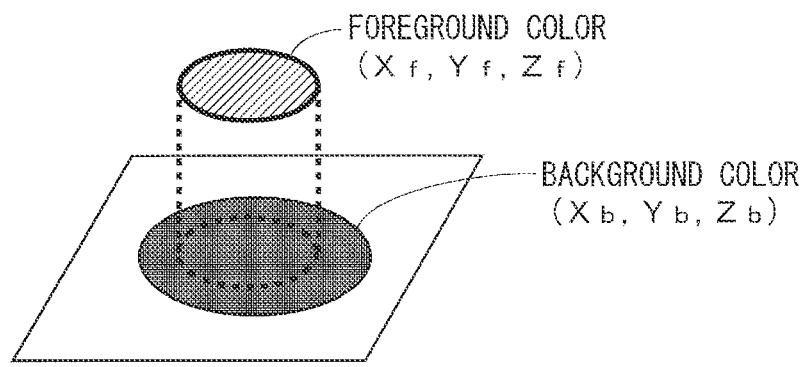
FIG. 20 is a diagram for describing a Deshpande et al. method in relation to a conventional example.
Figure 21:
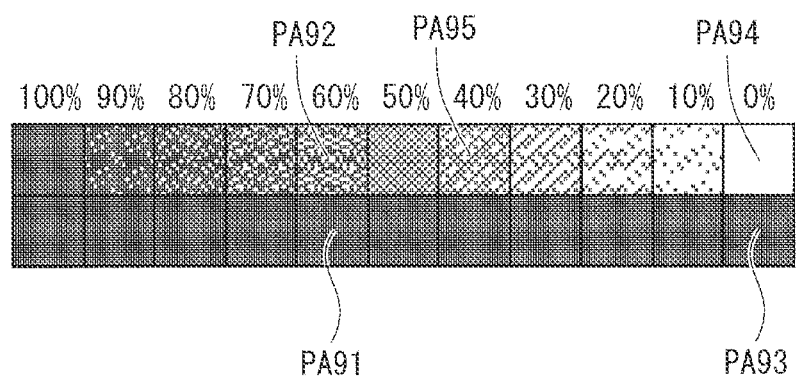
FIG. 21 is a diagram schematically showing an example of a CxF chart in relation to the conventional example.
Figure 22:
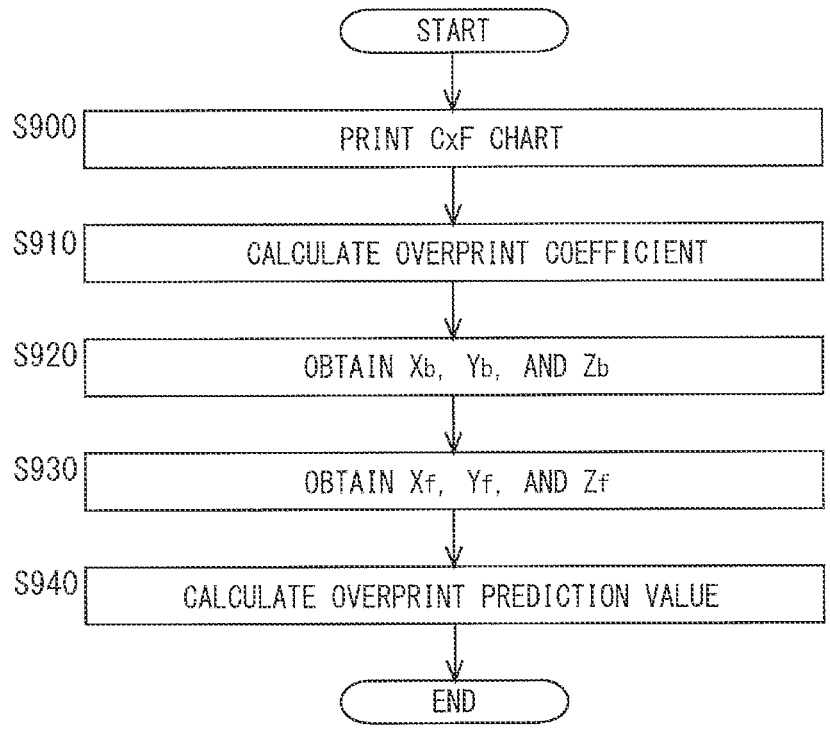
FIG. 22 is a flowchart for describing the Deshpande et al. method in relation to the conventional example.
Figure 23:
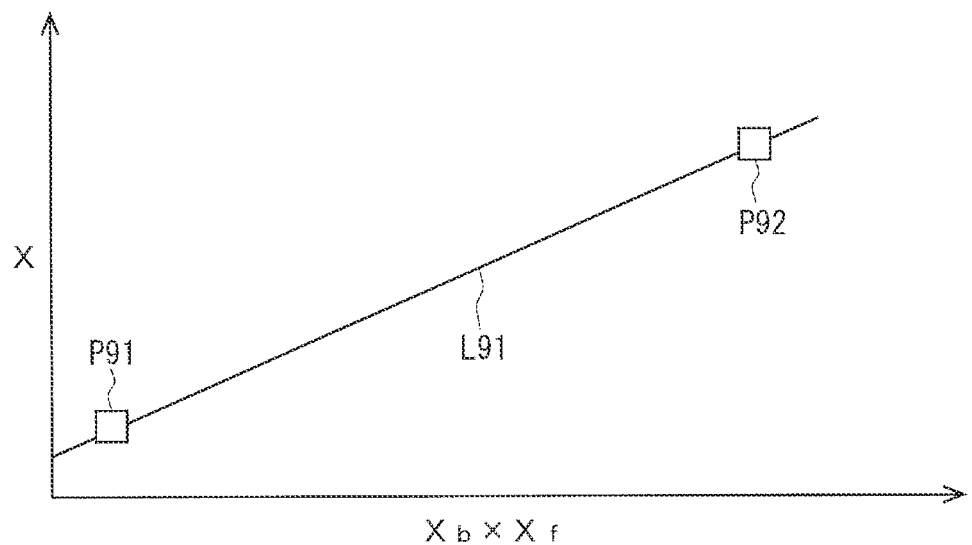
FIG. 23 is a diagram for describing the Deshpande et al. method in relation to the conventional example.

In the embodiment, after the first similar color is selected from a plurality of similar candidate colors, the first relational expression is calculated for the similar candidate color selected as the first similar color (see FIG. 6). However, the present invention is not limited to this example. The configuration may be such that, after the first relational expression for each of the plurality of similar candidate colors is calculated, the first similar color is selected from the plurality of similar candidate colors. Hereinafter, the general procedure of the color prediction process in the present modification will be described with reference to FIG. 19.

First, for each of the plurality of similar candidate colors, the first relational expression representing the relationship between the spectral reflectances in the reference medium and the spectral reflectances in the prediction target medium is obtained (step S410). That is, unlike the above embodiment, for example, in the case illustrated in FIG. 5, the first relational expression representing the relationship between the spectral reflectances of the solid patch PA2 in the sheet P and the spectral reflectances of the solid patch PA2 in the sheet Q is obtained for each of the three colors Cp, Cq, and Cr. In this manner, in the present modification, the print medium in which the spectral reflectances of all the first type patches 71 for the prediction target color have been obtained is used as the reference medium, and the plurality of colors for which the spectral reflectances of all the first type patches 71 in the reference medium and the spectral reflectances of all the first type patches 71 in the prediction target medium have been obtained are set as the plurality of similar candidate colors, and the first relational expression representing the relationship between the spectral reflectances of the solid patch PA2 in the reference medium and the spectral reflectances of the solid patch PA2 in the prediction target medium is obtained for each of the similar candidate colors.

Next, one color close to the prediction target color is selected as the first similar color from among the plurality of similar candidate colors (step S420). A specific method for selecting the first similar color is the same as that in the above embodiment.

Next, the predicted values of the spectral reflectances of the solid patch PA2 in the prediction target medium for the prediction target color is obtained by applying the spectral reflectances of the solid patch PA2 in the reference medium for the prediction target color to the first relational expression for the similar candidate color selected as the first similar color in step S420 (step S430). A specific method for obtaining the predicted values of the spectral reflectances of the solid patch PA2 is the same as that in the above embodiment.

Finally, the predicted values of the spectral reflectances of the halftone patches PA3 in the prediction target medium for the prediction target color are obtained using the predicted values obtained in step S430 (step S440). A specific method for obtaining the predicted values of the spectral reflectances of the halftone patches PA3 is the same as that in the above embodiment.

Meanwhile, unless the number of the similar candidate colors increases, the process in step S410 needs to be performed only once, and does not need to be performed every time when the process for one prediction target color is performed. On the other hand, the processes in step S420 to step S440 need to be performed every time when the process for one prediction target color is performed. In other words, the processing load when color prediction is actually performed is reduced by obtaining the first relational expressions for all the similar candidate colors in advance in step S410.

Note that, in the present modification, the first relational expression calculation step is achieved by step S410, the first similar color selection step is achieved by step S420, the solid prediction step is achieved by step S430, and the halftone prediction step is achieved by step S440.

6. Others

The present invention is not limited to the above-described embodiment (as well as modifications), and various variations can be made without departing from the spirit of the present invention. For example, although the example in which the printing paper is used as the print medium has been described in the embodiment (as well as the modifications), the present invention can also be applied to a case where various films, various labels, and the like are used as the print medium. Moreover, the present invention can also be embodied by appropriately combining the above embodiment and modifications so that there is no inconsistency.

This application is an application claiming priority based on Japanese Patent Application No. 2020-159130 entitled "Color Prediction Method and Color Prediction Program" filed on Sep. 23, 2020, and the contents of which are herein incorporated by reference.

What is claimed is:

1. A color prediction method for predicting a color of each patch when a color chart including a plurality of patches corresponding to ink densities of a plurality of levels is assumed to be created by applying an ink of a prediction target color to a prediction target medium with ink densities of the plurality of levels,
the plurality of patches including a solid patch on which an ink is applied at a maximum ink density, a medium color patch on which an ink is not applied, and a plurality of halftone patches on which inks are applied at ink densities between the solid patch and the medium color patch,
the color prediction method comprising:
a first similar color selection step of selecting a color close to the prediction target color from among a plurality of similar candidate colors as a first similar color, the plurality of similar candidate colors being a plurality of colors for which spectral characteristics of the solid patch in a reference medium and spectral characteristics of the solid patch in the prediction target medium are obtained, the reference medium being a medium in which spectral characteristics of the solid patch for the prediction target color are obtained;
a first relational expression calculation step of obtaining a first relational expression for the first similar color, the first relational expression representing a relationship between the spectral characteristics of the solid patch in the reference medium and the spectral characteristics of the solid patch in the prediction target medium;
a solid prediction step of obtaining predicted values of spectral characteristics of the solid patch in the prediction target medium for the prediction target color by applying the spectral characteristics of the solid patch in the reference medium for the prediction target color to the first relational expression; and
a halftone prediction step of, based on the predicted values obtained in the solid prediction step, obtaining predicted values of spectral characteristics of the plurality of halftone patches in the prediction target medium for the prediction target color.

2. The color prediction method according to claim 1, wherein when a plurality of reference media are present, all colors for which spectral characteristics of the solid patch in any of the reference media and spectral characteristics of the solid patch in the prediction target medium are obtained are set as the plurality of similar candidate colors.

3. The color prediction method according to claim 2, wherein
in the first similar color selection step, a reference medium for which information on the spectral characteristics of the solid patch for the prediction target color is to be used in the solid prediction step is further selected from among the plurality of reference media as a target reference medium,
in the first relational expression calculation step, an expression representing a relationship between the spectral characteristics of the solid patch in the target reference medium and the spectral characteristics of the solid patch in the prediction target medium is obtained as the first relational expression, and
in the solid prediction step, the predicted values of the spectral characteristics of the solid patch in the prediction target medium for the prediction target color are obtained by applying the spectral characteristics of the solid patch in the target reference medium for the prediction target color to the first relational expression.

4. The color prediction method according to claim 3, wherein
in the first similar color selection step,
a square error between spectral characteristics of the solid patch in a reference medium for the prediction target color and spectral characteristics of the solid patch in the reference medium for a similar candidate color is obtained for each of combinations of a similar candidate color and a reference medium, and a similar candidate color and a reference medium included in one of the combinations for which a least square error is obtained are respectively selected as the first similar color and the target reference medium.

5. The color prediction method according to claim 3, wherein
in the first similar color selection step,
a color difference between the prediction target color and a similar candidate color is obtained based on spectral characteristics of the solid patch in a reference medium for the prediction target color and spectral characteristics of the solid patch in the reference medium for the similar candidate color, for each of combinations of a similar candidate color and a reference medium, and
a similar candidate color and a reference medium included in one of the combinations for which a minimum color difference is obtained are respectively selected as the first similar color and the target reference medium.

6. The color prediction method according to claim 3, wherein
in the first similar color selection step,
a total similarity is obtained for each of combinations of a similar candidate color and a reference medium, based on a color similarity representing a similarity between spectral characteristics of the solid patch in a reference medium for the prediction target color and spectral characteristics of the solid patch in the reference medium for a similar candidate color, and based on a medium similarity representing a similarity between spectral characteristics of the medium color patch in the reference medium and spectral characteristics of the medium color patch in the prediction target medium, and
a similar candidate color and a reference medium included in one of the combinations for which a maximum total similarity is obtained are respectively selected as the first similar color and the target reference medium.

7. The color prediction method according to claim 1, wherein in the first similar color selection step, a square error between spectral characteristics of the solid patch in the reference medium for the prediction target color and spectral characteristics of the solid patch in the reference medium for each of the similar candidate colors is obtained, and a similar candidate color for which a least square error is obtained is selected as the first similar color.

8. The color prediction method according to claim 1, wherein in the first similar color selection step, a color difference between the prediction target color and each of the similar candidate colors is obtained based on spectral characteristics of the solid patch in the reference medium for the prediction target color and spectral characteristics of the solid patch in the reference medium for each of the similar candidate colors, and a similar candidate color for which a minimum color difference is obtained is selected as the first similar color.

9. The color prediction method according to claim 1, wherein
the halftone prediction step includes:
a second relational expression calculation step of obtaining a second relational expression for the first similar color, the second relational expression representing a relationship between the spectral characteristics of the solid patch in the prediction target medium and spectral characteristics of each of the plurality of halftone patches in the prediction target medium; and a predicted value calculation step of calculating predicted values of the spectral characteristics of each of the halftone patches in the prediction target medium for the prediction target color by applying the predicted values obtained in the solid prediction step to the second relational expression.

10. The color prediction method according to claim 1, wherein
the halftone prediction step includes:
a second similar color selection step of selecting a color close to the prediction target color from among a plurality of sample colors as a second similar color, the plurality of sample colors being a plurality of colors for which spectral characteristics of the plurality of patches in the prediction target medium are obtained;
a second relational expression calculation step of obtaining a second relational expression for the second similar color, the second relational expression representing a relationship between the spectral characteristics of the solid patch in the prediction target medium and spectral characteristics of each of the plurality of halftone patches in the prediction target medium; and
a predicted value calculation step of calculating predicted values of the spectral characteristics of each of the halftone patches in the prediction target medium for the prediction target color by applying the predicted values obtained in the solid prediction step to the second relational expression.

11. The color prediction method according to claim 10, wherein the first similar color and the second similar color are different colors.

12. The color prediction method according to claim 11, wherein
in the first similar color selection step, a color for which spectral characteristics of only the solid patch are obtained as spectral characteristics in the prediction target medium is selected as the first similar color, and
in the second similar color selection step, a color for which spectral characteristics of all of the plurality of patches are obtained as spectral characteristics in the prediction target medium is selected as the second similar color.

13. The color prediction method according to claim 1, wherein in the first relational expression calculation step, an expression for calculating an approximate value of the spectral characteristics of the solid patch in the prediction target medium for the prediction target color from the spectral characteristics of the solid patch in the reference medium for the prediction target color is obtained as the first relational expression, based on a plurality of pieces of combination data obtained for each unit wavelength range and obtained by combining the spectral characteristics of the solid patch in the reference medium for the first similar color and the spectral characteristics of the solid patch in the prediction target medium for the first similar color.

14. The color prediction method according to claim 13, wherein the first relational expression is an expression of degree n where n is an integer of 2 or more.

15. The color prediction method according to claim 13, wherein the first relational expression is represented by a power function.

16. The color prediction method according to claim 1, wherein the spectral characteristics includes spectral reflectances of a number obtained by dividing a wavelength range including a range from 400 nm to 700 nm by a unit wavelength range of an appropriate size.

17. The color prediction method according to claim 1, wherein the spectral characteristics are any one of spectral reflectances, spectral absorptivities, and spectral absorption coefficients.

18. A color prediction method for predicting a color of each patch when a color chart including a plurality of patches corresponding to ink densities of a plurality of levels is assumed to be created by applying an ink of a prediction target color to a prediction target medium with ink densities of the plurality of levels, the plurality of patches including a solid patch on which an ink is applied at a maximum ink density, a medium color patch on which an ink is not applied, and a plurality of halftone patches on which inks are applied at ink densities between the solid patch and the medium color patch, the color prediction method comprising:

a first relational expression calculation step of obtaining a first relational expression for each of a plurality of similar candidate colors, the first relational expression representing a relationship between spectral characteristics of the solid patch in the reference medium and spectral characteristics of the solid patch in the prediction target medium, the plurality of similar candidate colors being a plurality of colors for which the spectral characteristics of the solid patch in a reference medium and the spectral characteristics of the solid patch in the prediction target medium are obtained, the reference media being a medium in which spectral characteristics of the solid patch for the prediction target color are obtained;

a first similar color selection step of selecting a color close to the prediction target color from the plurality of similar candidate colors as a first similar color;

a solid prediction step of obtaining predicted values of spectral characteristics of the solid patch in the prediction target medium for the prediction target color by applying the spectral characteristics of the solid patch in the reference medium for the prediction target color to the first relational expression for the first similar color; and a halftone prediction step of, based on the predicted values obtained in the solid prediction step, obtaining predicted values of spectral characteristics of the plurality of halftone patches in the prediction target medium for the prediction target color.

19. A non-transitory computer readable recording medium recording a color prediction program that predicts a color of each patch when a color chart including a plurality of patches corresponding to ink densities of a plurality of levels is assumed to be created by applying an ink of a prediction target color to a prediction target medium with ink densities of the plurality of levels, the plurality of patches including a solid patch on which an ink is applied at a maximum ink density, a medium color patch on which an ink is not applied, and a plurality of halftone patches on which inks are applied at ink densities between the solid patch and the medium color patch, the color prediction program causes a computer to execute:

a first similar color selection step of selecting a color close to the prediction target color from among a plurality of similar candidate colors as a first similar color, the plurality of similar candidate colors being a plurality of colors for which spectral characteristics of the solid patch in a reference medium and spectral characteristics of the solid patch in the prediction target medium are obtained, the reference medium being a medium in which spectral characteristics of the solid patch for the prediction target color are obtained;

a first relational expression calculation step of obtaining a first relational expression for the first similar color, the first relational expression representing a relationship between the spectral characteristics of the solid patch in the reference medium and the spectral characteristics of the solid patch in the prediction target medium;

a solid prediction step of obtaining predicted values of spectral characteristics of the solid patch in the prediction target medium for the prediction target color by applying the spectral characteristics of the solid patch in the reference medium for the prediction target color to the first relational expression; and a halftone prediction step of, based on the predicted values obtained in the solid prediction step, obtaining predicted values of spectral characteristics of the plurality of halftone patches in the prediction target medium for the prediction target color.

* * * * *